United States Patent
Wang et al.

(10) Patent No.: US 11,071,050 B2
(45) Date of Patent: Jul. 20, 2021

(54) NETWORK FUNCTION INSTANCE SELECTION

(71) Applicant: Telefonaktiebolaget LM Ericsson (publ), Stockholm (SE)

(72) Inventors: Cheng Wang, Shanghai (CN); David Castellanos Zamora, Madrid (ES); Prajwol Kumar Nakarmi, Sollentuna (SE); Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/650,051

(22) PCT Filed: Jan. 15, 2019

(86) PCT No.: PCT/EP2019/050931
§ 371 (c)(1),
(2) Date: Mar. 24, 2020

(87) PCT Pub. No.: WO2019/138133
PCT Pub. Date: Jul. 18, 2019

(65) Prior Publication Data
US 2020/0296660 A1     Sep. 17, 2020

(30) Foreign Application Priority Data

Jan. 15, 2018 (WO) ................. PCT/CN2018/072579

(51) Int. Cl.
*H04W 48/16* (2009.01)
*H04W 8/20* (2009.01)
(Continued)

(52) U.S. Cl.
CPC ............. *H04W 48/16* (2013.01); *H04W 8/20* (2013.01); *H04W 12/033* (2021.01);
(Continued)

(58) Field of Classification Search
CPC .......... H04W 4/60; H04W 8/18; H04W 8/20; H04W 12/00; H04W 12/001;
(Continued)

(56) References Cited

U.S. PATENT DOCUMENTS 9,674,705 B2    6/2017 Rose et al.
10,419,922 B1*  9/2019 Kwok ................... H04W 12/04
(Continued)

FOREIGN PATENT DOCUMENTS

EP    1671511 B1    6/2011
RU    2317646 C2    2/2008

OTHER PUBLICATIONS

Behrad et al., Securing authentication for mobile networks, a survey on 4G issues and 5G answers, Feb. 19, 2018, 2018 21st Conference on Innovation in Clouds, Internet and Networks and Workshops (ICIN), Paris, France, 2018, pp. 1-8, doi: 10.1109/ICIN.2018.8401619 (Year: 2018).*

(Continued)

*Primary Examiner* — Eric Nowlin
(74) *Attorney, Agent, or Firm* — Murphy, Bilak & Homiller, PLLC

(57) ABSTRACT

Network equipment (26) in a wireless communication network is configured to receive at least a portion of a subscription concealed identifier, SUCI, (34) for a subscriber (13). The SUCI (34) contains a concealed subscription permanent identifier, SUPI, (20) for the subscriber (13). The received at least a portion of the SUCI (34) indicates a sub-domain code, SDC, (32). The SDC (32) indicates a certain sub-domain, from among multiple sub-domains (30-1, 30-2, ... 30-N) of a home network of the subscriber (13), to which the subscriber (13) is assigned. The network equipment (26) is also configured to determine, based on the SDC (32) and from among multiple instances (24-1, (Continued)

24-2, ... 24-M) of a provider network function in the home network respectively allocated to provide a service to be consumed for subscribers assigned to different sub-domains, an instance of the provider network function to provide the service to be consumed for the subscriber (13).

29 Claims, 16 Drawing Sheets

(51) Int. Cl.
*H04W 12/06* (2021.01)
*H04W 48/18* (2009.01)
*H04W 12/033* (2021.01)
*H04W 12/041* (2021.01)

(52) U.S. Cl.
CPC ......... *H04W 12/041* (2021.01); *H04W 12/06* (2013.01); *H04W 48/18* (2013.01)

(58) Field of Classification Search
CPC ....... H04W 12/0013; H04W 12/00514; H04W 12/00518; H04W 12/02; H04W 12/04031; H04W 12/0401; H04W 12/06; H04W 12/08; H04W 48/02; H04W 48/16; H04W 48/18
See application file for complete search history.

(56) References Cited

U.S. PATENT DOCUMENTS

| | | | | |
|---|---|---|---|---|
| 10,425,817 | B2* | 9/2019 | Torvinen | H04L 9/0841 |
| 10,499,357 | B1* | 12/2019 | Tiwari | H04W 12/02 |
| 10,631,161 | B2* | 4/2020 | Nakarmi | H04W 12/04033 |
| 10,652,729 | B1* | 5/2020 | Kwok | H04W 60/00 |
| 2010/0124193 | A1 | 5/2010 | Prakash et al. | |
| 2010/0136967 | A1 | 6/2010 | Du et al. | |
| 2013/0003971 | A1 | 1/2013 | Forsberg et al. | |
| 2015/0312873 | A1 | 10/2015 | Cormier et al. | |
| 2019/0098502 | A1* | 3/2019 | Torvinen | H04L 9/0841 |
| 2019/0149521 | A1* | 5/2019 | Jerichow | H04W 12/02 713/171 |
| 2019/0246267 | A1* | 8/2019 | Nakarmi | H04W 12/04033 |
| 2019/0253395 | A1* | 8/2019 | Bykampadi | H04W 12/00505 |
| 2019/0364428 | A1* | 11/2019 | Torvinen | H04L 9/0841 |
| 2019/0364430 | A1* | 11/2019 | Ainali | H04W 12/001 |
| 2020/0092836 | A1* | 3/2020 | Tiwari | H04W 12/08 |
| 2020/0154264 | A1* | 5/2020 | Kwok | H04L 63/0414 |
| 2020/0213840 | A1* | 7/2020 | Nakarmi | H04W 76/11 |
| 2020/0213843 | A1* | 7/2020 | An | H04L 9/30 |
| 2020/0229120 | A1* | 7/2020 | Tiwari | H04W 12/00409 |

OTHER PUBLICATIONS

Aboba, B, et al., "The Network Access Identifier", IETF RFC 4282, Dec. 2005, pp. 1-16.
Unknown, Author, "3rd Generation Partnership Project; Technical Specification Group Core Network and Terminals; Numbering, addressing and identification (Release 15) The present", 3GPP TS 23.003 V15.2.0, Dec. 2017, pp. 1-116.
Unknown, Author, "3rd Generation Partnership Project; Technical Specification Group Services and System Aspects; Procedures for the 5G System; Stage 2 (Release 15)", 3GPP TS 23.502 V15.0.0, Dec. 2017, pp. 1-258.
Unknown, Author, "3rd Generation Partnership Project; Technical Specification Group Services and System Aspects; Security Architecture and Procedures for 5G System (Release 15)", 3GPP TS 33.501 V0.4.0, Oct. 2017, pp. 1-70.
Unknown, Author, "3rd Generation Partnership Project; Technical Specification Group Services and System Aspects; System Architecture for the 5G System; Stage 2 (Release 15)", 3GPP TS 23.501 V15.0.0, Dec. 2017, pp. 1-181.
Unknown, Author, "Moving UE handling SUCI to SUCI clause", 3GPP TSG SA WG3 (Security) Meeting #89; S3-173140; revision of S3-17xabc; Reno, NV, USA, Nov. 27-Dec. 1, 2017, pp. 1-2.
Unknown, Author, "NF discovery with SUCI", 3GPP TSG SA WG3 (Security) Meeting #90; S3-180267; revision of S3-17xabc; Gothenburg, Sweden, Jan. 22-26, 2018, pp. 1-2.
Unknown, Author, "Pseudo-CR on Requirements for NF service discovery and selection", 3GPP TSG CT4 Meeting #78; C4-173259; Zhangiajie, P.R. China, May 15-19, 2017, pp. 1-4.
Unknown, Author, "Selection of AUSF and UDM with SUCI", 3GPP TSG-SA WG3 Meeting #91; S3-181343; Belgrade, Serbia, Apr. 16-20, 2018, pp. 1-3.
Unknown, Author, "SIDF functionality", 3GPP TSG SA WG3 (Security) Meeting #88Bis Adhoc; S3-172356; revision of S3-1 lxabc; Singapore, Oct. 9-13, 2017, pp. 1-3.

* cited by examiner

NETWORK FUNCTION INSTANCE SELECTION

TECHNICAL FIELD

The present application relates generally to a wireless communication network, and more particularly relates to selecting of a network function instance in a wireless communication network.

BACKGROUND

The next generation (5G) core network (CN) will use a service-based architecture that leverages service-based interactions between CN network functions (NFs). NFs in this regard enable other authorized NFs to access their services. Alternatively or in addition to predefined interfaces being defined between network elements, an instance of an NF needing to consume a service of a certain type queries a so-called network repository function (NRF) to discover and communicate with an instance of another NF that provides that certain type of service.

In particular, NFs can take on a provider role as a provider of a service (NFp) and/or a consumer role as a consumer of a service (NFc). An instance of an NFp starts and registers itself to the NRF. This registration allows the NRF to be aware that the instance of the NFp exists. At a later point, an instance of an NFc that needs to use a specific service runs a procedure called discovery towards the NRF. In case the NRF has a registered instance of the NFp that matches this discovery request, the NRF provides the instance of the NFc with information needed to set up communication with a discovered instance of the NFp. This information may be for example the IP address and port of the NFp instance.

The service-based architecture advantageously enables greater flexibility and speed in the development of new CN services, as it becomes possible to connect to other components without introducing new interfaces. The service-based architecture also introduces the possibility to use application programming interfaces (APIs) based on web technology that makes development easier, as libraries and development tools for such technology are already broadly available. The service-based architecture nonetheless introduces challenges to NF discovery and selection, especially as the number of subscribers in the network scales.

SUMMARY

Embodiments herein include a method performed by network equipment in a wireless communication network. The method comprises receiving at least a portion of a subscription concealed identifier for a subscriber, wherein the subscription concealed identifier contains a concealed subscription permanent identifier for the subscriber. The received at least a portion of the subscription concealed identifier indicates a sub-domain code. The sub-domain code indicates a certain sub-domain, from among multiple sub-domains of a home network of the subscriber, to which the subscriber is assigned. The method may also include determining, based on the sub-domain code and from among multiple instances of a provider network function in the home network respectively allocated to provide a service to be consumed for subscribers assigned to different sub-domains, an instance of the provider network function to provide the service to be consumed for the subscriber.

In some embodiments, determining the instance of the provider network function to provide the service to be consumed for the subscriber is also based on a home network identifier.

In some embodiments, the method also comprises receiving a discovery request for discovering one or more instances of the provider network function in the home network to provide the service to be consumed for the subscriber and responding to the discovery request with the selected instance of the provider network function.

In some embodiments, the network equipment implements a network repository function, NRF.

In some embodiments, the method may also comprise receiving information that configures the network equipment to associate the sub-domain code with one or more instances of the provider network function allocated to provide the service to be consumed for subscribers assigned to the certain sub-domain. In one or more such embodiments, for example, the information includes the certain sub-domain code and routing information for the one or more instances of the provider network function, such that the information configures the network equipment to associate the sub-domain code with the routing information. In some embodiments in this regard, the routing information is an Internet Protocol, IP, address, a host name, a domain name, or a uniform resource identifier, of the selected instance.

In some embodiments, different sub-domains of the home network are associated with different routing information, and the sub-domain code is an identifier associated with the routing information for the certain sub-domain.

In some embodiments, determining the sub-domain code comprises determining the sub-domain code from a field in the at least a portion of the subscription concealed identifier, wherein the field is a sub-domain code field dedicated to indicating a sub-domain code.

In some embodiments, the provider network function is a unified data management function, a subscription identifier de-concealing function, or an authentication server function.

Embodiments also include a method performed by network equipment in a wireless communication network according to other embodiments. The method includes obtaining a sub-domain code indicating a certain sub-domain, from among multiple sub-domains of a home network of a subscriber, to which the subscriber is assigned. The method may also include transmitting information that configures other network equipment to associate the sub-domain code with a certain instance of a provider network function among multiple instances of the provider network function in the home network that are respectively allocated to provide a service to be consumed for subscribers assigned to different sub-domains of the home network.

In some embodiments, the information includes the sub-domain code and routing information for the certain instance, such that the information configures the other network equipment to associate the sub-domain code with the routing information. In one or more such embodiments, the routing information is an Internet Protocol, IP, address, a host name, a domain name, or a uniform resource identifier, of the certain instance.

In some embodiments, the network equipment implements an operation and maintenance function, the certain instance of the provider network function, or a proxy for the certain instance of the provider network function.

In some embodiments, the provider network function is a unified data management function, a subscription identifier de-concealing function, or an authentication server function.

In some embodiments, the other network equipment implements a network repository function.

In some embodiments, different sub-domains of the home network are associated with different routing information, and the sub-domain code is an identifier associated with the routing information for the certain sub-domain.

In some embodiments, the method also comprises generating a field that indicates the sub-domain code. In this case, the field may be a sub-domain code field dedicated to indicating a sub-domain code. In such a case, the information that configures the other network equipment may include the field.

Embodiments further include a method performed by network equipment in a wireless communication network according to still other embodiments. The method includes obtaining a sub-domain code indicating a certain sub-domain, from among multiple sub-domains of a home network of a subscriber, to which the subscriber is assigned. The method may also include transmitting information that configures a user equipment of the subscriber, or an integrated circuit card associated with the subscriber, with the obtained sub-domain code.

In some embodiments, the network equipment implements an operation and maintenance function, an instance of a provider network function in the home network that is to provide or is capable of providing a service to be consumed for the subscriber, or a proxy for one or more instances of the provider network function. For example, the provider network function may be a unified data management function, a subscription identifier de-concealing function, or an authentication server function.

In some embodiments, different sub-domains of the home network are associated with different routing information, and the sub-domain code is an identifier associated with the routing information for the certain sub-domain.

In some embodiments, the method be also include generating a field that indicates the sub-domain code. In one or more embodiments, the field is a sub-domain code field dedicated to indicating a sub-domain code. In this case, transmitting the information may comprise transmitting the field to the user equipment or the integrated circuit card.

Embodiments also include a method performed by a user equipment or an integrated circuit card associated with a subscriber. The method comprises receiving, from network equipment in a wireless communication network, information that configures the user equipment or the integrated circuit card with a sub-domain code that indicates a certain sub-domain, from among multiple sub-domains of a home network of the subscriber, to which the subscriber is assigned. In some embodiments, the method may also comprise transmitting a message that includes a subscription concealed identifier. In some embodiments, the subscription concealed identifier contains a concealed subscription permanent identifier for the subscriber and indicates the sub-domain code.

In some embodiments, the network equipment implements an operation and maintenance function, an instance of a provider network function in the home network that is to provide or is capable of providing a service to be consumed for the subscriber, or a proxy for one or more instances of the provider network function.

In some embodiments, the provider network function is a unified data management function, a subscription identifier de-concealing function, or an authentication server function.

In some embodiments, different sub-domains of the home network are associated with different routing information, and wherein the sub-domain code is an identifier associated with the routing information for the certain sub-domain.

In some embodiments, receiving the sub-domain code comprises receiving a field that indicates the sub-domain code. In one or more embodiments, the field is a sub-domain code field dedicated to indicating a sub-domain code.

In some embodiments, the method may also comprise generating the subscription concealed identifier to include a field that indicates the sub-domain code.

Embodiments may also include corresponding apparatus, computer programs, and carriers. For example, some embodiments herein include network equipment configured for use in a wireless communication network. The network equipment may be configured (e.g., via communication circuitry and processing circuitry) to receive at least a portion of a subscription concealed identifier for a subscriber. The received at least a portion of the subscription concealed identifier indicates a sub-domain code. The sub-domain code indicates a certain sub-domain, from among multiple sub-domains of a home network of the subscriber, to which the subscriber is assigned. The network equipment may also be configured to determine, based on the sub-domain code and from among multiple instances of a provider network function in the home network respectively allocated to provide a service to be consumed for subscribers assigned to different sub-domains, an instance of the provider network function to provide the service to be consumed for the subscriber.

Embodiments may further include network equipment in a wireless communication network according to other embodiments. The network equipment may be configured (e.g., via communication circuitry and processing circuitry) to obtain a sub-domain code indicating a certain sub-domain, from among multiple sub-domains of a home network of a subscriber, to which the subscriber is assigned. The network equipment may also be configured to transmit information that configures other network equipment to associate the sub-domain code with a certain instance of a provider network function among multiple instances of the provider network function in the home network that are respectively allocated to provide a service to be consumed for subscribers assigned to different sub-domains of the home network.

Embodiments also include network equipment in a wireless communication network according to still other embodiments. The network equipment may be configured (e.g., via communication circuitry and processing circuitry) to obtain a sub-domain code indicating a certain sub-domain, from among multiple sub-domains of a home network of a subscriber, to which the subscriber is assigned. The network equipment may also be configured to transmit information that configures a user equipment of the subscriber, or an integrated circuit card associated with the subscriber, with the obtained sub-domain code.

Embodiments also include a user equipment or an integrated circuit card associated with a subscriber. The user equipment or integrated circuit card is configured (e.g., via communication circuitry and processing circuitry) to receive, from network equipment in a wireless communication network, information that configures the user equipment or the integrated circuit card with a sub-domain code that indicates a certain sub-domain, from among multiple sub-domains of a home network of the subscriber, to which the subscriber is assigned. In some embodiments, the user equipment or integrated circuit card is further configured to transmit a message that includes a subscription concealed identifier. In some embodiments, the subscription concealed identifier contains a concealed subscription permanent identifier for the subscriber and indicates the sub-domain code.

DETAILED DESCRIPTION

Figure 1:
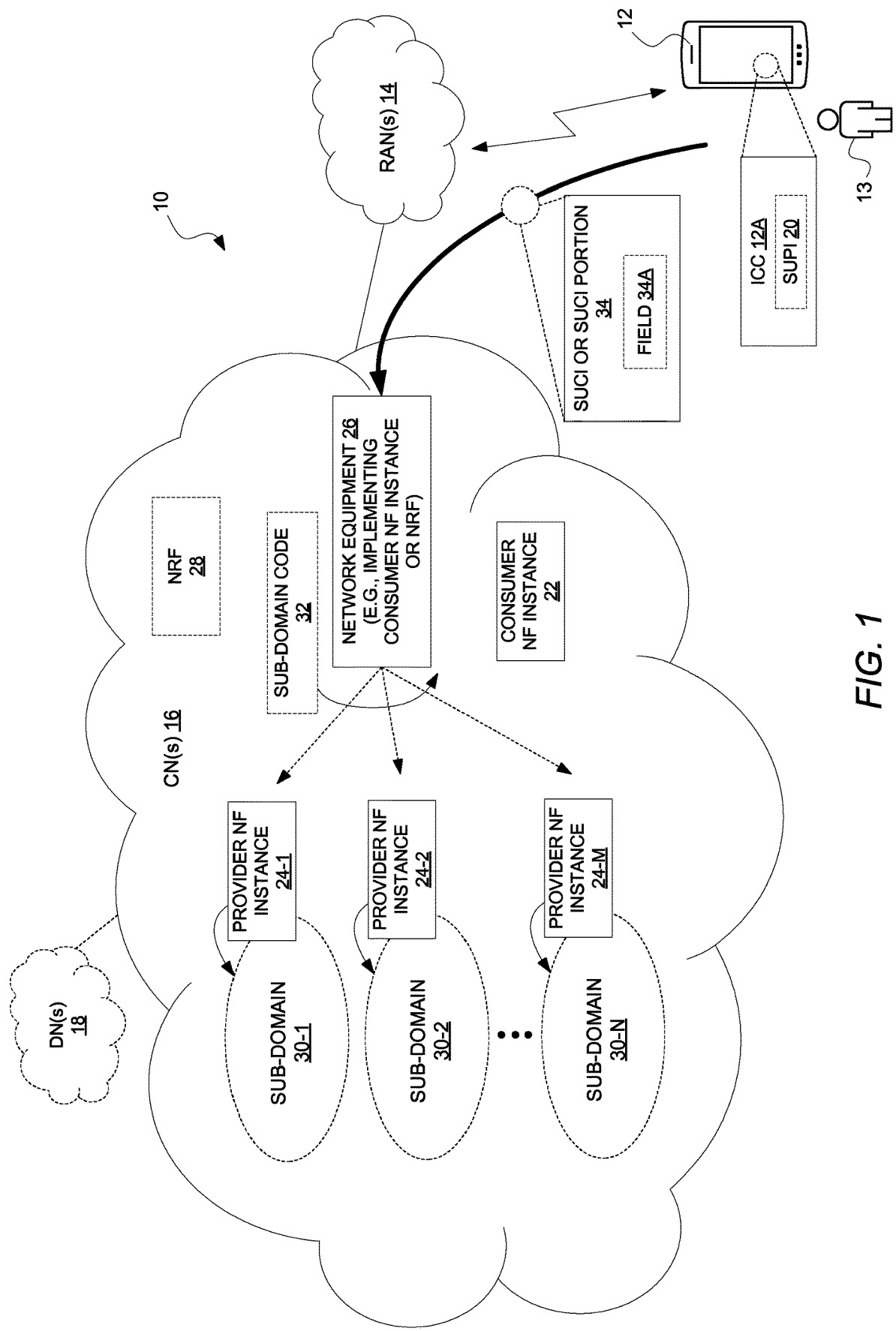
FIG. 1 is a block diagram of a wireless communication network according to some embodiments.

FIG. 1 shows a wireless communication network 10 according to some embodiments. The network 10 includes one or more radio access networks (RANs) 14 that wirelessly connect user equipment 12 to one or more core networks (CNs) 16, e.g., of one or more public land mobile networks (PLMNs), including a home PLMN associated with the user equipment 12. The CN(s) 16 in turn connect the user equipment 12 to one or more data networks 18, e.g., the Internet, a public switched telephone network (PSTN), etc.

The user equipment 12 as shown may include an integrated circuit card (ICC) 12A. The ICC 12A may be for instance a universal integrated circuit card (UICC) that executes a universal subscriber identity module (USIM) application. Regardless, the user equipment 12 and/or ICC 12A may be associated with a certain subscriber 13. The user equipment 12 and/or ICC 12A may for instance store, access, or otherwise use a certain subscription identifier that identifies a subscription of the certain subscriber 13, e.g., to a home network such as a home PLMN. The subscription identifier or a derivative thereof may be used to identify and authenticate the subscriber 13 to the wireless communication network 10. Where the subscription identifier is assigned to the subscriber 13 on a long-term or permanent basis, the subscription identifier may be referred to as a subscription permanent identifier (SUPI) 20, shown in FIG. 1 as being stored on the ICC 12A. In embodiments that the network 10 is a 5G network, the subscription identifier may be a globally unique 5G identifier that takes the form of either an international mobile subscriber identity (IMSI) or a network access identifier (NAI).

The CN(s) 16 in some embodiments have a service-based architecture that leverages service-based interactions between CN network functions (NFs). An NF may be implemented by network equipment either as a network element on dedicated hardware, as a software instance running on dedicated hardware, or as a virtualized function instantiated on an appropriate platform, e.g., on a cloud infrastructure. Where the system 10 is a 5G system, for instance, NFs in the control plane may include an access and mobility management function (AMF), a session management function (SMF), a policy control function (PCF), an authentication server function (AUSF), a unified data management (UDM) function, a subscriber identifier de-concealing function (SIDF), etc.

An NF may provide its services to other authorized NFs that consume those services for a subscriber. An NF may thereby take on a provider role as a provider of a service (i.e., provider NF) and/or a consumer role as a consumer of a service (i.e., consumer NF). For example, in a 5G network, an AUSF may take on a provider role to provide authentication services to an AMF (taking on a consumer role) for authenticating a subscriber. In any event, an NF needing to consume a certain type of service initiates or performs discovery of an NF instance that can provide that certain type of service. With a provider NF discovered, the consumer NF may consume the service from the provider NF.

Some contexts complicate this service-based architecture approach, though. For example, the CN 16 of a subscriber's home network may implement multiple instances of a certain NF, e.g., in order to balance processing, storage, or other resource demands across the multiple instances of the NF and/or to provide services more quickly and/or efficiently. Where the certain NF serves as a provider NF in providing a service to an instance of a consumer NF, this means that multiple provider NF instances in the subscriber's home network may be candidates for providing the service to the consumer NF instance. With this complexity added to the service-based architecture, some embodiments herein address how to select which of the multiple provider NF instances is to provide the service to the consumer NF instance which is to consume the service for the subscriber 13.

FIG. 1 in this regard shows a consumer NF instance 22 (e.g., an instance of an AMF or AUSF). The consumer NF instance 22 needs to consume a service (e.g., of a certain type) for the subscriber 13 associated with the user equipment 12 and/or ICC 12A. The subscriber's home network implements multiple provider NF instances 24-1, 24-2, . . . 24-M (e.g., multiple instances of a UDM function, an SIDF, an AUSF, etc.) that are candidates for providing this service (e.g., of the certain type) to the consumer NF instance 22 which is to consume the service for the subscriber 13. Network equipment 26 is configured to select, from among these multiple provider NF instances 24-1, 24-2, . . . 24-M, a provider NF instance to provide the service for the subscriber 13; that is, to provide the service which is to be consumed (by the consumer NF instance 22) for the subscriber 13. Such selection herein just generally refers to the fact that the network equipment 26 determines a provider NF instance to provide the service to be consumed for the subscriber 13, by choosing that provider NF instance from the multiple provider NF instances 24-1, 24-2, . . . 24-M which are candidates for doing so.

In some embodiments, network equipment 26 implements the consumer NF instance 22 (i.e., so that the consumer NF instance 22 performs the selection itself) or a proxy for the consumer NF instance 22. In this and other cases, the network equipment's selection may be referred to formally as NF selection, or may be performed as part of such formal NF selection. In other embodiments, network equipment 26 implements a network repository function (NRF) 28 (i.e., so that the network repository function 28 performs the selection. In this and other cases, the network equipment's selection may be referred to formally as NF discovery, or may be performed as part of such formal NF discovery. In still other embodiments, network equipment 26 implements a proxy for one or more of the provider NF instances. Regardless, the network equipment 26 according to some embodiments herein advantageously performs the selection based on a so-called sub-domain code. That is, the network equipment 26 herein bases its determination as to which of the NF provider instances 24-1, 24-2, . . . 24-M is to provide the service to be consumed for the subscriber 13 on a sub-domain code.

More particularly in this regard, the subscriber's home network as shown in FIG. 1 is divided into multiple sub-domains 30-1, 30-2, . . . 30-N. Subscribers of the home network, including the subscriber 13 associated with the user equipment 12 and/or ICC 12A, are each assigned to one or more of the sub-domains 30-1, 30-2, . . . 30-N. The provider NF instances 24-1, 24-2, . . . 24-M in the home network are in turn respectively allocated to provide a service (e.g., of a certain type) for subscribers assigned to different ones of the sub-domains. That is, different provider NF instances 24-1, 24-2, . . . 24-M may provide the service for subscribers in different sub-domains 30-1, 30-2, . . . 30-N. Where M=N, for example, each one of the provider NF instances provides the service for subscribers in a different one of the sub-domains. By contrast, where M>N, some of the provider NF instances may provide the service for subscribers in the same sub-domain.

In order to select a provider NF instance to provide the service for the subscriber 13 associated with the user equipment 12 and/or ICC 12A, network equipment 26 is configured to select a provider NF instance that is allocated to provide the service for subscribers assigned to the same sub-domain as the subscriber 13. The network equipment 26 in this regard identifies or otherwise determines a sub-domain code 32 that indicates a certain sub-domain, from among the multiple sub-domains 30-1, 30-2, . . . 30-N of the subscriber's home network, to which the subscriber 13 is assigned. A sub-domain code as used herein is any information that encodes or otherwise indicates a certain one of the sub-domains 30-1, 30-2, . . . 30-N, as distinguished from others of the sub-domains. After determining the sub-domain code 32 indicating the sub-domain to which the subscriber 13 is assigned, the network equipment 26 bases its selection from the provider NF instances 24-1, 24-2, . . . 24-M on that sub-domain code 32. The network equipment 26 may for instance perform the selection according to a defined mapping or association between sub-domain codes and provider NF instances 24-1, 24-2, . . . 24-M. In some embodiments, for example, the network equipment 26 receives information (e.g., from an operation and maintenance function, OMF, or other network equipment) that configures the network equipment 26 with this defined mapping or association.

Basing the network equipment 26's NF instance selection on a sub-domain code notably enhances the robustness, efficiency, and/or flexibility of NF instance selection for the subscriber 13. Indeed, such NF instance selection is possible even under circumstances where the user equipment 12 and/or ICC 12A conceals the subscription identifier (e.g., SUPI 20) over-the-air so as to conceal the identity of the subscriber 13 from the network equipment 26 and/or even where different sub-domains are associated with different ranges of subscription identifiers. For example, the user equipment 12 and/or ICC 12A may generate a subscription concealed identifier (SUCI) that conceals the subscription identifier associated with the subscriber 13, e.g., by encrypting at least a portion of the subscription identifier such as the portion that specifically identifies the subscriber 13. The user equipment 12 and/or ICC 12A may then transmit at least a portion of the SUCI 34 in lieu of the subscription identifier itself (e.g., in lieu of the SUPI 20). The network equipment 26 may correspondingly receive at least a portion of the SUCI 34, e.g., in a message from the user equipment 12, the ICC 12A, or other network equipment in the network 10. Even in this case where the subscription identifier is concealed, the network equipment 26 may nonetheless determine the sub-domain code 32 (indicating the sub-domain to which the subscriber 13 is assigned) from the SUCI or SUCI portion 34 received, e.g., without the need to decipher or de-conceal the subscription identifier.

Figure 2A:
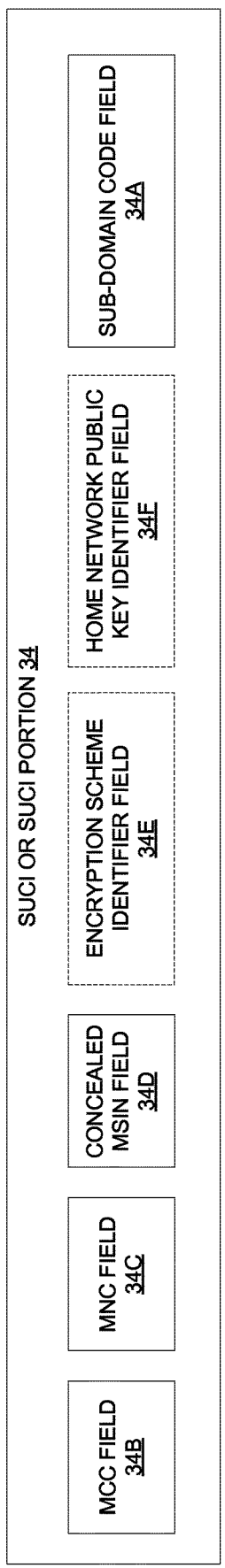
FIG. 2A is a block diagram of a subscription concealed identifier according to some embodiments.
Figure 2B:
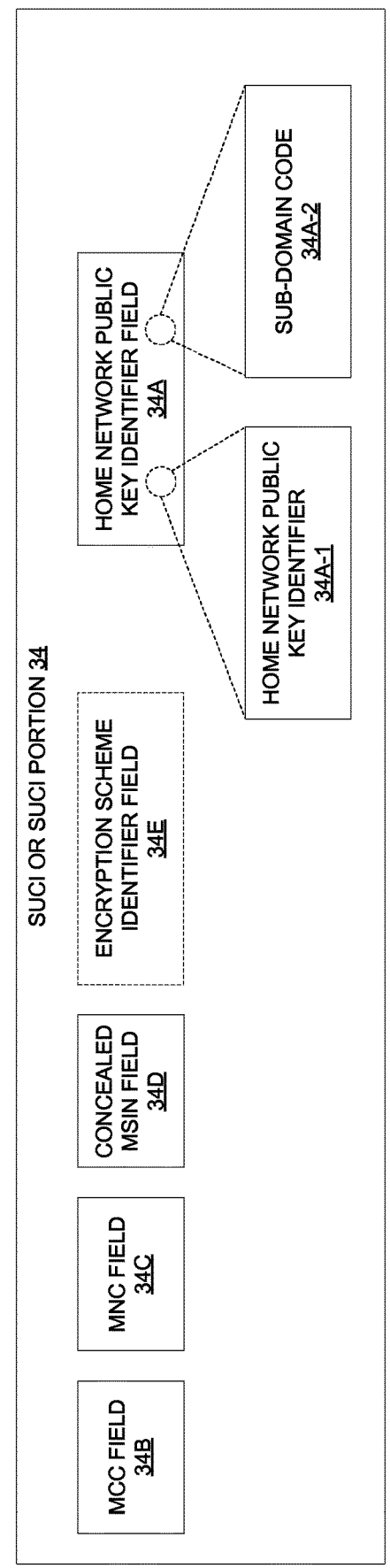
FIG. 2B is a block diagram of a subscription concealed identifier according to other embodiments.
Figure 2C:
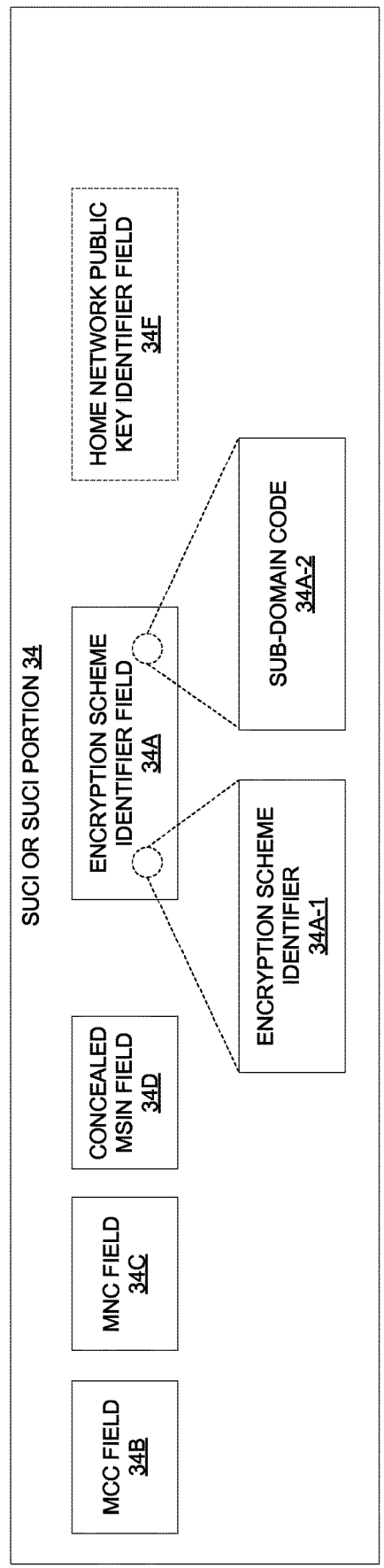
FIG. 2C is a block diagram of a subscription concealed identifier according to still other embodiments.

In some embodiments, for example, the SUCI or SUCI portion 34 received includes a field 34A that indicates the sub-domain code 32. The field 34A may be a sub-domain code field that is dedicated to indicating a sub-domain code, e.g., in the sense that the field 34A exclusively indicates a sub-domain code. Alternatively, the field 34A may be a field that is configured or configurable to (e.g., jointly) indicate a sub-domain code and other information. In some embodiments, for instance, the field 34A indicates both a sub-domain code and encryption information identifying a parameter based on which the SUCI was or is to be encrypted. In some embodiments, for instance, the field 34A is configurable to indicate both the sub-domain code and the encryption information by concatenating the sub-domain code with the encryption information. Alternatively or additionally, the field 34A may be configurable to indicate both the sub-domain code and the encryption information by indicating the sub-domain code and the encryption information in a defined order, with zero or more delimiters between the sub-domain code and the encryption information. In any of these examples, then, the sub-domain code may be determined from the field 34A by extracting the sub-domain code from the field 34A so as to separate the sub-domain code from the encryption information. Such extraction may involve splitting the sub-domain code from the encryption information and/or applying a regular expression to the field 34A that separate the sub-domain code from the encryption information (e.g., using regular expression matching based on any delimiter(s) between them). FIGS. 2A-2C illustrate a few examples of these embodiments.

As shown in FIG. 2A, the SUCI or SUCI portion 34 includes a mobile country code (MCC) field 34B, a mobile network code (MNC) field 34C, and a concealed mobile subscription identification number (MSIN) field 34D. The SUCI or SUCI portion 34 may also include an encryption scheme identifier field 34E and/or a home network (HN) public key identifier field 34F. The MCC field 34B in combination with the MNC field 34C uniquely identify a mobile network operator (carrier). The concealed MSIN field 34D, once de-concealed, uniquely identifies a subscriber of the mobile network operator. The encryption scheme identifier field 34E identifies an encryption scheme that is to be used or was used to encrypt the SUCI or SUCI portion 34 (e.g., more particularly, the concealed MSIN field 34D). The home network public key identifier field 34F indicates a home network public key that is to be used or was used to encrypt the SUCI or SUCI portion 34 (e.g., more particularly, the concealed MSIN field 34D). In addition to and/or separate from these fields, the SUCI or SUCI portion 34 according to some embodiments also includes a sub-domain code field as field 34A. The sub-domain code field 34A is dedicated to indicating a sub-domain code as described herein.

Note that although not shown the sub-domain code may also be added to the SUPI 20, or provisioned separately in the user equipment 12 and/or ICC 12A. Where the sub-domain code is added to the SUPI 20, the SUPI 20 may use the NAI format. The sub-domain code may be added to the realm part of the NAI which would require no changes to the NAI format described in the IETF RFC 4282 or in the 3GPP specifications. Examples of such encoding may be username@SDC.homerealm.example.net or SDC.homerealm.example.net!username@visitedrealm.example.net. Here, the "username" corresponds to the MSIN, and the "realm" corresponds to the MCC+MNC. In the NAI syntax of the SUCI, the username is encrypted, and the HN public key identifier field and/or the encryption scheme field is incorporated.

In other embodiments shown in FIG. 2B, by contrast, the SUCI or SUCI portion 34 does not include a field dedicated to indicating a sub-domain code. Instead, the home network public key identifier field serves as field 34A that is configurable to indicate both a sub-domain code 34A-2 as well as a home network public key identifier 34A-1. The home network public key identifier identifies a home network public key based on which the SUCI or SUCI portion 34 (e.g., more particularly, the concealed MSIN field 34D) is to be or was encrypted.

Some embodiments, for example, employ two counters, one for identifying the HN public key (e.g., 0x01 in hexadecimal) and another for indicating the sub-domain code (e.g. 0x05 in hexadecimal). The HN public key identifier field 34A then amounts to the concatenation of the two counters, i.e., 0x0105. Other embodiments use a regular expression that separates the HN public key identifier and the sub-domain code from one another. For example, a regular expression "(\d)(\d)" without quotes may be used to split a 2 digit number so that the first digit is the HN public key identifier and the second digit is the sub-domain code. With that regular expression, a HN public key identifier field with value "15" without quotes would result in 1 as denoting the HN public key identifier and 5 as second group denoting the sub-domain code. Another example of a regular expression allowing alphanumeric characters would be "(\d+)-([a-z]+)" without quotes. This regular expression may be used so that a HN public key identifier field with value "1-five" without quotes would result in 1 as first group denoting the HN public key identifier and five as second group denoting the sub-domain code, the hyphen separating the two. Yet another example is that the HN public key identifier field may be decrypted using a symmetric algorithm and a secret key resulting in a clear-text identifier of the HN public key and the SDC.

In still other embodiments shown in FIG. 2C, the SUCI or SUCI portion 34 also does not include a field dedicated to indicating a sub-domain code. Instead, the encryption scheme identifier field serves as field 34A that is configurable to indicate both a sub-domain code 34A-2 as well as an encryption scheme identifier 34A-1. The encryption scheme identifier 34A-1 identifies an encryption scheme based on which the SUCI or SUCI portion 34 (e.g., more particularly, the concealed MSIN field 34D) is to be or was encrypted. This may be implemented using concatenation or other formatting as described above with respect to the home network public key identifier field.

Note that, in some embodiments, field 34A being configurable to indicate both a sub-domain code and other information (e.g., encryption information) means that the field 34A is flexibly permitted to be used for indicating both a sub-domain code and other information, e.g., according to a defined format understood by the network equipment 26 and/or the user equipment 12/ICC 12A. The field 34A in some embodiments is also configurable to indicate only the other information, not the sub-domain code, e.g., according to a different format understood by the network equipment 26 and/or the user equipment 12/ICC 12A.

In some embodiments, then, use of the field 34A may remain implementation-specific, e.g., so that the field 34A may be used for indicating the sub-domain code in conjunction with the other information if or when such a sub-domain code needs to be signaled. This relieves any dependency on the user equipment 12 and the NFs on supporting various formats of the SUCI. Indeed, for any networks that do not implement multiple instances of NFs, those networks need not support or implement a format of the SUCI that indicates a sub-domain code. Moreover, this implementation-specific approach provides network operators flexibility and control on how to hide the network topology, e.g., using custom-made regular expressions. Still further, this approach allows a network operator to flexibly choose to implement a stand-alone NF (e.g., SIDF) or combined NFs (e.g., SIDF collocated with UDM). Yet further, the implementation-specific approach advantageously safeguards privacy of the subscriber by preventing or at least mitigating the possibility to link a sub-domain code with a certain subscriber or subscriber group.

Irrespective of whether or how a sub-domain code is conveyed with the SUCI or SUCI portion 34, indicating sub-domains 30-1, 30-2, . . . 30-N using sub-domain codes enables the sub-domains in some embodiments to be defined and/or indicated based on any sort of criteria (e.g., based upon physical, logical, functional, or other type of characteristics/responsibilities associated with the sub-domains). Alternatively, in other embodiments, indicating sub-domains 30-1, 30-2, . . . 30-N using sub-domain codes enables the sub-domains to be arbitrarily defined and/or indicated (e.g., randomly or according to network operator preference).

In some embodiments, for example, different subsets of subscribers are assigned to different sub-domains 30-1, 30-2, . . . 30-N, e.g., so that different provider NF instances are allocated to provide the service for different subsets of the home network's subscribers. Where the provider NF is a UDM, for instance, the network 10 may implement multiple UDM instances, each storing data of a different subset of subscribers. Such may be the case for instance where the home network has a large number of subscribers (e.g., several millions or even billions of subscribers). Despite the assignment of certain subscribers to certain sub-domains, network equipment 26 may determine the sub-domain code indicating to which sub-domain a subscriber is assigned independently of or otherwise without regard to determining the subscription identifier (e.g., SUPI) that identifies that subscriber. In fact, in some embodiments, different the sub-domains are indicated by different randomly generated and/or network operator specific sub-domain codes, e.g., the sub-domain codes are randomly generated numeric values such as 12382, 88274, 93422145, etc. In these and other embodiments, then, the network equipment 26 may determine a sub-domain code from the SUCI or SUCI portion 34 (e.g., by reading field 34A), even if the subscription identifier is concealed in the SUCI or SUCI portion (e.g., in the concealed MSIN field 34D).

Similarly, in other embodiments, different sub-domains of the home network may correspond to different geographical or logical locations, e.g., of the home network. In this case, a sub-domain code may be an identifier of a geographical or logical location with which a certain sub-domain corresponds. Alternatively or additionally, a sub-domain code may be based on a geographical location or a network's logical location/topology, e.g., an alphanumeric string such as "Stockholm-kista-2", "Gothenburg-5", "Lat:59.3293, Lon:18.0686", etc.

In still other embodiments, different sub-domains of the home network may correspond to different slices or sub-networks of the home network. In this case, a sub-domain code may be an identifier of a certain slice or sub-network with which a certain sub-domain corresponds, e.g., an alphanumeric string such as "slice-1", "network_7", etc. Alternatively or additionally, a sub-domain code may be based on any other network deployment information.

In yet other embodiments, different sub-domains of the home network may be associated with different routing information (for NF provider instances allocated to different sub-domains), e.g., different IP addresses. In this case, a sub-domain code may be an identifier associated with the routing information for a certain sub-domain and/or for an NF provider instance allocated to a certain sub-domain, e.g., an alphanumeric string such as "10.10.1.192" showing the IP address. Alternatively or additionally, a sub-domain code may be based on a reference to routing information of an NF provider instance allocated to a certain sub-domain, e.g., an alphanumeric string such as "AUSF-1" referring to the IP address of a certain AUSF instance.

In other embodiments, each sub-domain of the home network may be associated with one or more ranges of subscription identifiers (e.g., one or more ranges of SUPIs). In this case, the sub-domain code may be an identifier of one or more ranges of subscription identifiers associated with a certain sub-domain, e.g., a tuple value such as {1000000-5000000}, etc. Alternatively or additionally, a sub-domain code may be based on subscriber identifier information.

In still other embodiments, a sub-domain code may be based on a home network public/private key's internal identifier, e.g., internal to the home network, e.g., a numeric value such as 2, 3, 4, etc. Alternatively or additionally, a sub-domain code may be based on encryption scheme(s) supported by different SIDF instances, e.g., an alphanumeric string such as "ECIES-brainpool", "ECIES-secp256r1", etc.

Figure 3:
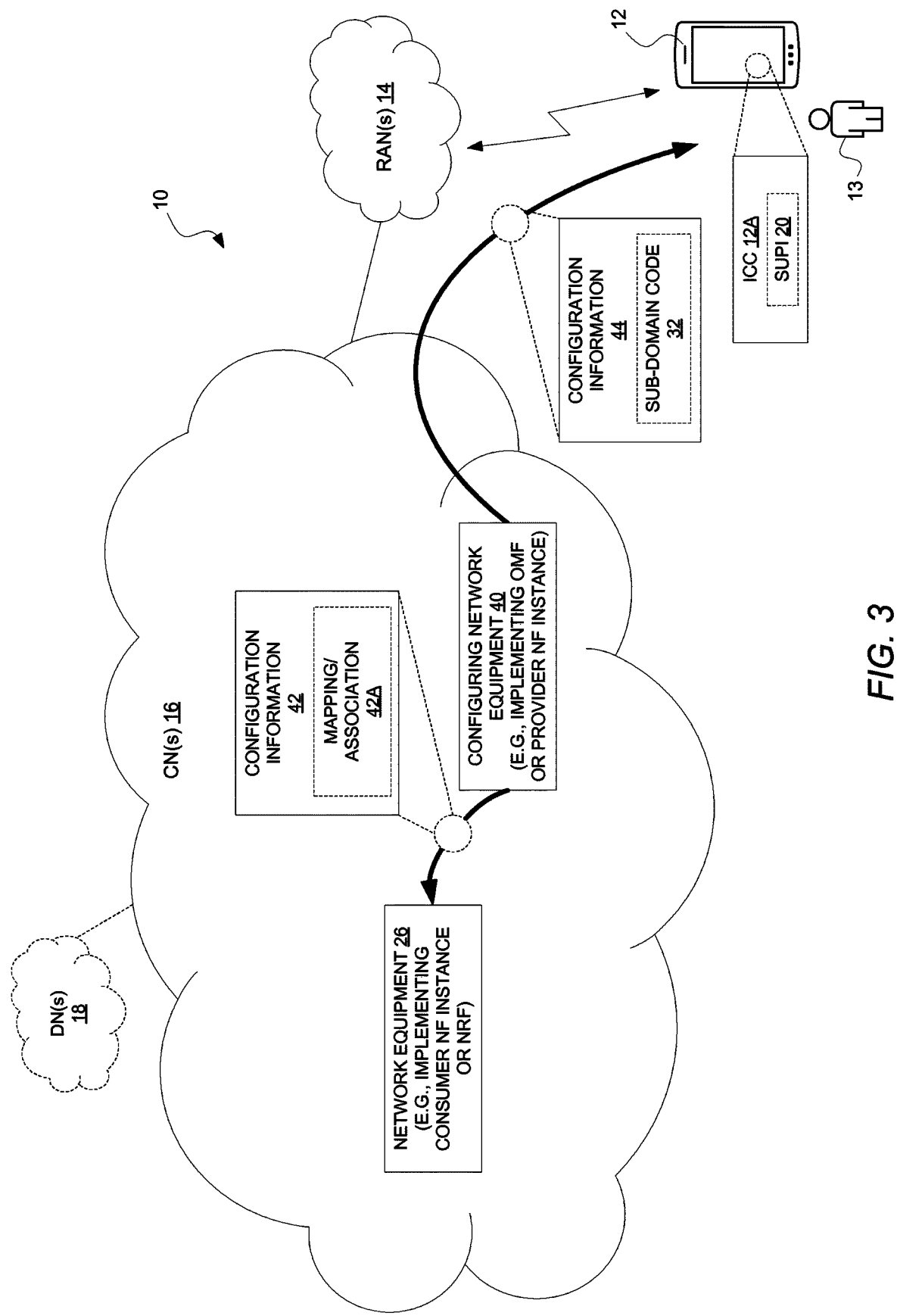
FIG. 3 is a block diagram of a wireless communication network according to some embodiments for configuring network equipment and/or user equipment/ICC.

No matter the particular form of a sub-domain code, network equipment 26 in some embodiments is configured by other network equipment to associate the sub-domain code 32 with a certain provider NF instance, e.g., for performing the provider NF instance selection as described above. The same or different network equipment may alternatively or additionally configure the user equipment 12 and/or ICC 12A with the sub-domain code 32, e.g., for inclusion in the SUCI or SUCI portion 34. FIG. 3 illustrates one example according to some embodiments.

As shown in FIG. 3, the network 10 includes configuring network equipment 40. The configuring network equipment 40 in some embodiments implements an operation and maintenance function (OMF), whereas in other embodiments the network equipment 40 implements a certain provider NF instance, or a proxy for the provider NF instance. Regardless, the network equipment 40 configures the network equipment 26 to perform NF instance selection and/or configure the user equipment 12 or ICC 12A with a sub-domain code 32.

The network equipment 40 in this regard is configured to obtain the sub-domain code 32 indicating the certain sub-domain, from among the home network's multiple sub-domains 30-1, 30-2, . . . 30-N, to which the subscriber 13 is assigned. The network equipment 40 is further configured to transmit information 42 that configures network equipment 26 to associate the sub-domain code 32 with a certain provider NF instance among the provider NF instances 24-1, 24-2, . . . 24-M that are respectively allocated to provide a service fir subscribers assigned to different sub-domains 30-1, 30-2, . . . 30-N. FIG. 3 for instance shows that the information 42 includes a mapping or association 42A between the sub-domain code 32 and a certain provider NF instance. This mapping or association 42A in some embodiments may also indicate the association between one or more other sub-domain codes (not shown) and one or more other provider NF instances. Regardless, the configuration information 42 may include (e.g., as part of the mapping or association 42A) the sub-domain code 32 and routing information for the associated provider NF instance, e.g., such that the information configures network equipment 26 to associate the sub-domain code 32 with that routing information. The routing information may for example be in the form of an IP address, a host name, a domain name, or a uniform resource identifier, of the provider NF instance. In any event, the configuration information 42 in some embodiments includes the field 34A described above that indicates the sub-domain code 32. That is, the network equipment 40 generates or otherwise obtains the field 34A and transmits the field 34A to indicate the sub-domain code 32, e.g., as part of the mapping or association 42A. In some embodiments, the network equipment 40 extracts the sub-domain code 32 from the field 34A to associate the sub-domain code 32 with a certain provider NF instance, whereas in other embodiments (e.g., where the field 34A is dedicated to indicating a sub-domain code) the network equipment 40 may simply associate the field 34A with a certain provider NF instance.

Network equipment 40 in FIG. 3 alternatively or additionally obtains the sub-domain code 32 indicating the certain sub-domain, from among the home network's multiple sub-domains 30-1, 30-2, . . . 30-N, to which the subscriber 13 is assigned, and transmits information 44 that configures the user equipment 12 or the ICC 12A with the obtained sub-domain code 32. The network equipment 40 may for example generate or otherwise obtain the field 34A and transmit the field 34A to indicate the sub-domain code 32. The user equipment 12 and/or ICC 12A may correspondingly receive the information 44 (e.g., field 34A) that configures the user equipment 12 and/or ICC 12A with the sub-domain code 32.

Configured with the sub-domain code 32, the user equipment and/or ICC 12A may thereafter generate the SUCI or SUCI portion 34 to include the field 34A indicating the sub-domain code 32. The user equipment 12 and/or ICC 12A may then transmit a message that includes the SUCI or SUCI portion 34, e.g., such as a registration message or attachment request message.

In some embodiments, such as where use of the field 34A is implementation-specific (e.g., according to network operator preference), the user equipment 12 and/or ICC 12A need not extract the sub-domain code 32 from the received field 34A before generating the SUCI or SUCI portion 34 to include the field 34A. In fact, in some embodiments where the field 34A indicates both the sub-domain code 32 and other information (e.g., encryption information), the user equipment 12 and/or ICC 12A need not understand or know that the field 34A actually indicates both the sub-domain code 32 and the other information. Instead, the user equipment 12 and/or ICC 12A may "blindly" or "ignorantly" generate the SUCI or SUCI portion 34 with the received field 34A, without reading or understanding the field 34A.

Note that the above described embodiments may apply to any type of consumer NF and any type of provider NF. Also note that the network equipment 26 performing provider NF instance selection may be any type of network equipment 26 in the network 10.

Note that although some embodiments (e.g., illustrated in the Figures) were described with respect to a consumer NF instance and provider NF instances, some aspects of the embodiments may be implemented by a proxy of the consumer NF instance and/or one or more proxies of one or more of the provider NF instances.

Note also that the SUCI in the 5G system may still contain un-encrypted SUPI in a special case when the so-called null scheme is used. The null scheme does not perform any encryption on the SUPI.

Figure 4:
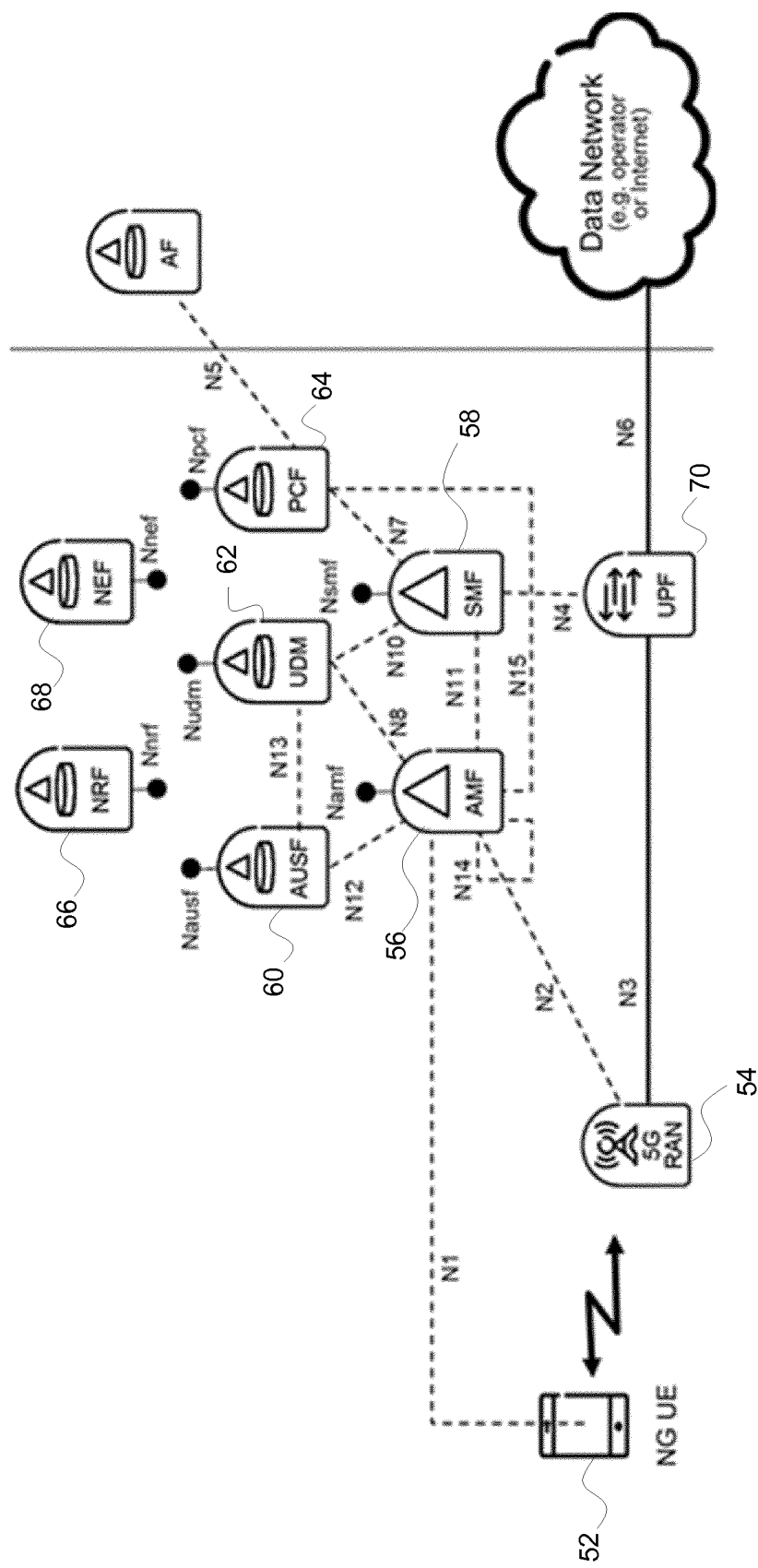
FIG. 4 is a block diagram of a 5G network according to some embodiments.

Some embodiments will now be described at times with reference to a 5G network. The 3GPP is the main standardization body for network functions and protocols of cellular networks. It has standardized third generation (3G) and fourth generation (4G) of cellular networks and is also responsible for standardization of fifth generation (5G) of cellular networks. The 3GPP technical specification called the 3GPP TS 23.501 defines the 5G network architecture, which is shown in FIG. 4. On a high level, a 5G network consists of three main entities, namely a next generation user equipment (NG UE), a 5G radio access network (5G RAN) and a 5G core network. The NG UE 52 and the 5G RAN 54 are shown in FIG. 4. All the rest can be loosely considered as being the 5G core network. 5G subscribers use the NG UE 52 to access the 5G core network via wireless radio communication provided by the 5G RAN 54. A brief description of the 5G core network functions (NFs) follows. The access and mobility management function (AMF) 56 supports NG UE's mobility; the session management function (SMF) 58 handles configuration and maintenance of UE traffic steering; the authentication server function (AUSF) 60 is responsible for authentication the subscription used by the NG UE; the unified data management (UDM) 62 does storage and management of subscription data; the policy control function (PCF) 64 supports framework to govern network behavior; the network function repository function (NRF) 66 supports discovery of various core network services; the network exposure function (NEF) 68 provides means to securely expose NFs' services and capabilities; and the user plane function (UPF) 70 provides interconnection to data network, packet routing and forwarding.

The dashed-lines in FIG. 4 indicate interfaces carrying control plane traffic and the solid-lines in FIG. 4 indicate interfaces carrying user plane traffic. The labels from N1 to N15 near the lines are the name of the corresponding interfaces. The short lines with filled-circles-end-points and labels near them denote being part of the SBA which is explained next.

The 3GPP has designed the 5G core network architecture for better cloud and virtualization techniques adoption by introducing the so-called service based architecture (SBA) where the network functions (NFs), e.g., AMF 56, AUSF 60, and so on, can dynamically expose, discover, and invoke each other and each other's services, i.e., NF/service. The NF/service discovery is implemented via a logical function called the network function repository function (NRF) 66 which supports the following functionalities according to the 3GPP TS 23.501: Supports service discovery function, Receives NF Discovery Request from NF instance, and provides the information of the discovered NF instances (be discovered) to the NF instance, and maintains the NF profile (described later) of available NF instances and their supported services.

When a consumer NF (i.e., a requester NF, say an AMF) contacts the NRF 66 for discovery of a producer NF (i.e., a requested NF) of some type (say of type SMF), the NRF 66 may discover and provide multiple producer NFs (say multiple SMFs) to the consumer NF (i.e. the AMF). In such case, the consumer NF performs so-called NF selection. The NF selection consists of selecting one producer NF instance among the producer NF instance(s) discovered during the NF service discovery. The NF selection may be implemented by the consumer NF, e.g. the SMF selection is supported by the AMF 56. Alternatively, the NF selection may be implemented by the NRF 66 or a proxy for the consumer NF.

In the context of roaming, multiple NRFs may be deployed in the different networks, including the NRF(s) in the Visited PLMN (vNRF) configured with information for the visited PLMN, and the NRF(s) in the Home PLMN (hNRF) configured with information for the home PLMN, referenced by the vNRF via the N27 interface.

The NF/NF service discovery across PLMNs works as follows (based on 3GPP TS 23.502, clause 4.17.5). The consumer NF (say an AMF 56) is located in the VPLMN, and the producer NF (say an AUSF 60 or UDM 62) is located in the HPLMN. The consumer NF first contacts the vNRF. The vNRF then triggers the NF discovery on behalf of the NR consumer towards the hNRF. This basically means that each PLMN hosts and maintains its own NRF data locally. Only the interface (e.g. the input and output values) for the NF service discovery needs to be standardized while the exact method of discovery can remain local to HPLMN.

For the NRF to properly maintain the information of available NF instances and their supported services, each NF instance informs the NRF 66 of information comprising the list of NF services that the NF instance supports among other NF instance information, the information being called the NF profile. The typical information included in the NF profile could be, as per 3GPP TS 23.501, the following: NF instance ID, NF type, Public Land Mobile Network Identifier (PLMN ID), Network Slice related Identifier(s) e.g. Single Network Slice Selection Assistance Information (S-NSSAI), or Network Slice Instance Identifier (NSI ID), Fully Qualified Domain Name (FQDN) or IP address of NF, NF capacity information, NF Specific Service authorization information, Names of supported services, Endpoint information of instance(s) of each supported service, and/or Other service parameter, e.g., Data Network Name (DNN), notification endpoint for each type of notification that the NF service is interested in receiving.

The 5G core network is able to make the best use of cloud and virtualization techniques because it is designed based on the concept called the Service-Based Architecture (SBA). The advantage of the SBA is that some NFs can dynamically expose, discover, and invoke each other. According to embodiments herein, a 5G core network deployment may have multiple instances of producer NFs (also equivalently referred to herein as provider NFs). Each producer NF instance may for example be configured to serve, or be capable of serving, only a subset of subscribers, not a whole set of subscribers. In such deployments, when a subscriber makes some kind of request to a consumer NF, it becomes challenging for the consumer NF to discover, select, or invoke a correct producer NF instance which is configured to serve or be capable of serving that particular subscriber. The same challenge is true for the NRF 66, if the NRF 66 is responsible to make a selection among multiple instances of NFs.

Embodiments herein thereby provide a mechanism for discovery and selection of network functions which are suitable for serving certain subscribers. The mechanism may be effective in the sense that the mechanism selects a correct or suitable network function instance, among multiple network function instances (e.g., of the same type), which is capable for serving certain subscriber(s). Additionally or alternatively, the mechanism may be efficient in the sense that it imposes minimal operational burden and/or provides harmonization with existing messages.

More particularly, it is a challenge for a consumer NF or a NRF to discover, select, or invoke a correct producer NF instance (e.g., of a certain type) among multiple producer NF instances (e.g., of the same type). An example of this challenge follows. A big operator running a cellular network may have several millions or even billions of subscribers, say 650 million. The operator may choose to have multiple instances of UDM 62, each one storing data of its regional subscribers. Say there are 10 UDM instances, i.e., UDM-1 to UDM-10, and the corresponding regions are REGION-1 to REGION-10. Now, when a random subscriber from REGION-5 travels to REGION-10 and uses its NG UE 52 to access the operator's network, a registration request is sent to an AMF 56. Next, the AMF 56 contacts an NRF 66 to discover an NF instance of type UDM. The NRF 66 discovers and returns 10 UDM instances to the AMF 56. Now, it is challenging for the AMF 56 to select among the 10 UDM instances the correct one that is capable of serving the subscriber, which would be the UDM-5.

In the above example and the following text, the AMF 56, which is a consumer NF, uses the NRF 66 to discover the UDM instance, which is a producer NF instance. In practice, an NF consumer in embodiments herein is not bound to just the AMF 56 or UDM 62; it could be other functions, such as AUSF 60. The examples are given as illustration and are by no means limiting. In fact, in most use cases that are currently described in 3GPP specifications, the AMF 56 discovers AUSF 60. Similarly, SUPI and IMSI are used interchangeably to denote a long-term or permanent identifier assigned to a subscriber by its home network operator. But the IMSI (as specified in 3GPP TS 23.003) is only one SUPI type, and other types exist too, such as NAI (IETF RFC 4282) for non-IMSI based SUPIs. The NG UE 52 and the subscribers are also used interchangeably for simplicity, even though a subscriber may be a human user that uses the NG UE 52 to connect to the network. The term NG UE 52 may also be used as encompassing Universal Subscriber Identity Module (USIM), Universal Integrated Circuit Card (UICC), and Mobile Equipment (ME).

With these qualifications, one potential solution for the challenge would be that the AMF 56 makes use of the subscriber's SUPI. In the above example, 650 million subscribers means 650 million SUPIs which would be separated into 10 ranges of SUPIs, each range belonging to a region, and be allocated to the 10 UDMs. It means that each UDM 62 will store data of 65 million SUPIs. The ranges of SUPIs and the corresponding UDMs 72 would be preconfigured in the AMF 56. Therefore, when the subscriber from REGION-5 sends a registration request using its NG UE 52, the AMF 56 would inspect the SUPI contained in the registration request, determine the range of the SUPI, and be able to select UDM-5.

However, the above mentioned solution may not be sufficient under some circumstances. This is because the SUPI could be in a concealed form, meaning that the AMF 56 cannot always inspect the SUPI. Unlike in 4G systems, the 5G system enables the NG UE 52 to conceal the SUPI by using encryption techniques based on the home network operator's public key, the concealed SUPI being called Subscription Concealed Identifier (SUCI). Therefore, the AMF 56 could get SUCI instead of SUPI and because of encryption, the AMF 56 would not be able to determine the rage of the SUPI. It is so because the AMF 56 would need to de-conceal the SUCI into SUPI by using decryption techniques, and the AMF 56 cannot do that. In 5G, de-concealing the SUCI into SUPI is only performed by a NF called Subscription Identifier De-Concealing Function (SIDF). The SIDF could be deployed as a standalone NF, or co-located with other NFs e.g. AUSF 60 or UDM 62. Currently, it is assumed, by 3GPP and also here, that the SIDF would be collocated with the UDM 62, and therefore, in the rest of the text, it is assumed that the UDM 62 can de-conceal the SUCI into SUPI.

Another potential solution would be that the AMF 56 performs some heuristics on the SUCI and guesses the range of the SUPI, e.g., by inspecting the bit-pattern of the encrypted bits in the SUCI. However, such a solution is infeasible, if not impossible, because the encryption technique used for concealing SUPI into SUPI are probabilistic, meaning that every encryption produces different output.

Another potential solution that takes care of the above mentioned problem with SUCI would be to utilize as many home network operator's public keys (HN public keys) as the UDM instances. As said earlier, in 5G systems, the NG UE 52 could conceal the SUPI into SUCI by using encryption techniques based on the HN public key. While it is possible and allowed for the home network operator to use a single HN public key for all the subscribers, it is not mandatory to do so. In practice, the home network operator could have 10 different HN public keys, in the above example, each one for SUPIs stored in one of the 10 regions or UDM instances. In other words, the HN public key used by the NG UE 52, in the above example, would be specific for the UDM-5. When the NG UE 52 sends the registration request, the NG UE 52 would indicate an identifier for the HN public key which was used to conceal the SUPI into SUCI. Therefore, even though the AMF 56 would not be able to determine the range of the SUPI, the AMF 56 may be able to identify UDM-5 based on the HN public key identifier sent by the NG UE 52.

While the above mentioned solution of using multiple HN public keys works for some use cases, it could have limitations for others. One reason is that having multiple HN public keys would mean requiring corresponding multiple HN private keys. With multiple HN public/private key pairs, there would be additional operational and security burden, e.g., for key generation, key distribution, and key revocations.

In relation to the above mentioned example, some embodiments herein advantageously enable the AMF 56 to select the correct instance of UDM 62, i.e., the UDM-5. Generally, some embodiments herein logically group NF instances into different sub-domains, e.g., so that the NG UE 52 is able to send to the network an indication of the sub-domain the NG UE's subscriber belongs to. The network may then select the correct UDM instance based on the sub-domain indication sent by the NG UE 52. It could be either the AMF 56 or the NRF 66, in the above example, who selects the UDM-5.

The 10 UDM instances, possibly along with 10 AUSFs or other NFs as deemed necessary, would be assigned 10 sub-domain codes. All the 10 UDM instances may use the same HN public/private key pair. Therefore, it should be appreciated that with some embodiments that exploit sub-domain codes, there is no need for a UDM specific HN public/private key pair.

According to some embodiments, the SUPI, when using the IMSI format, is composed of a Mobile Country Code (MCC), a Mobile Network Code (MNC), and a Mobile Subscription Identification Number (MSIN). And the SUCI is composed of at least the MCC, the MNC, an encrypted MSIN, and a HN public key identifier field which was used to encrypt the MSIN. The NAI syntax of SUPI is very similar to IMSI: the "username" corresponds to the MSIN, and the "realm" corresponds to the MCC+MNC (e.g. username@homerealm.example.net or homerealm.example.net!username@visitedrealm.example.net). In the NAI syntax of the SUCI, the username is encrypted, and the HN public key identifier field is incorporated.

Some embodiments exploit the SUCI to indicate a sub-domain code (SDC). In some embodiments, for example, a sub-domain code is indicated by the HN public key identifier field, in addition to identifying the HN public key. In other embodiments, a separate field is used for indication of the SDC, meaning that either the SUPI is extended to be composed of the SDC in addition to the MCC, MNC, and MSIN, or the SDC will be separately provisioned in the NG UE 52. Correspondingly, the SUCI is extended to be composed of the SDC in addition to at least the MCC, MNC, encrypted MSIN, and HN public key identifier field.

Figure 5:
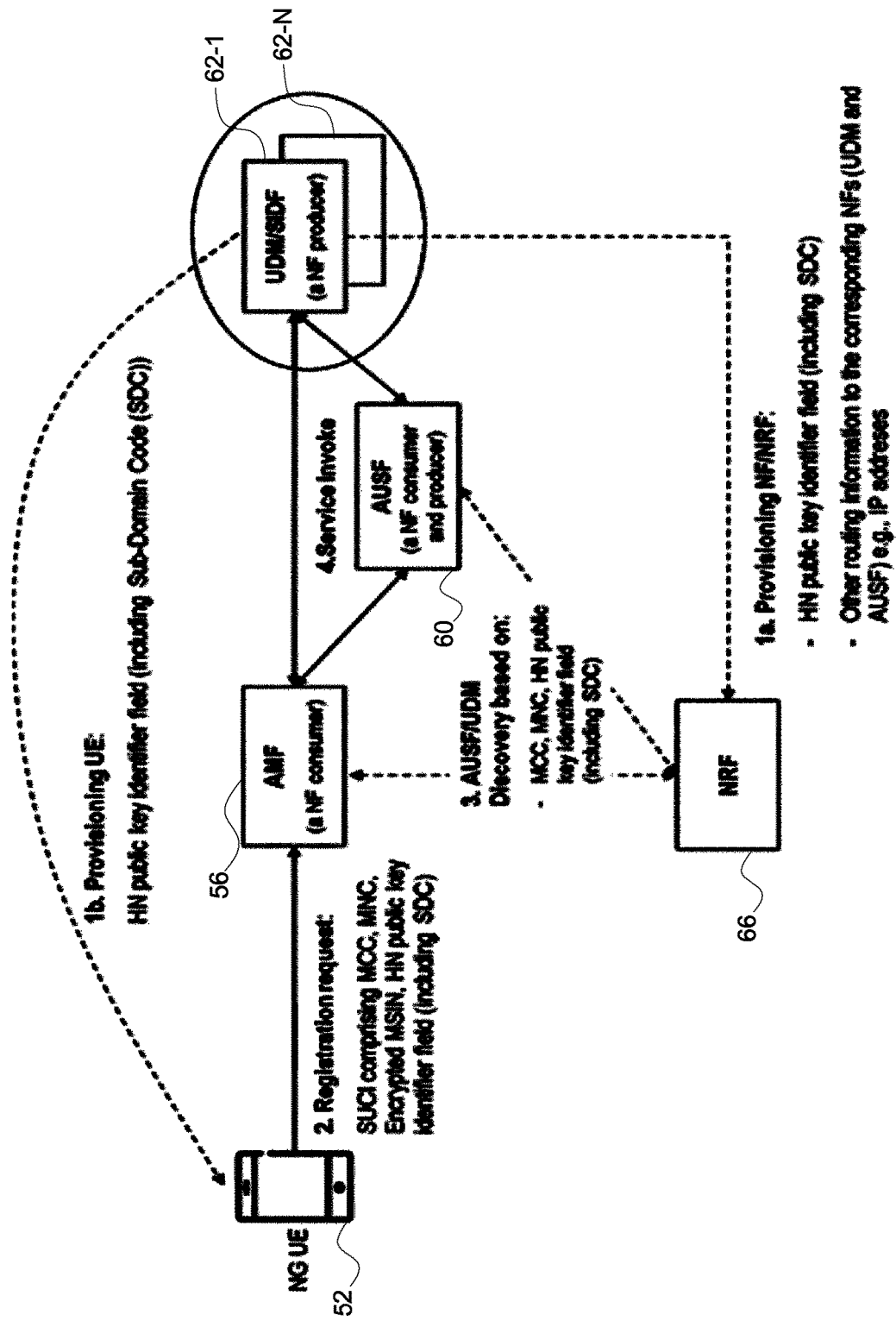
FIG. 5 is a call flow diagram for processing performed by a 5G UE and network functions for provider network function instance selection according to some embodiments.

FIG. 5 illustrates one example implementation of the former embodiment in which the HN public key identifier field indicates a SDC in addition to the HN public key. In Step 1 a/b of FIG. 5, some function or node in operator's network provisions the NRF 66 and the NG UE 52 respectively with the information shown (e.g., the HN public key identifier field), as explained earlier. The HN public key identifier field is constructed so that it contains both the identification of the HN public key to be used to encrypt SUPI and the SDC. Any function or node may perform the provisioning, not just the one shown in FIG. 5. Generally, those NFs which could be discovered later may register their support for discovery based on the SDC and any other necessary routing information. In our example, it is the UDM 62 where SIDF is collocated.

In Step 2, the NG UE 52 sends a registration request to the AMF 56. The request comprises at least the SUCI. The SUCI in turn comprises of at least the MCC, MNC, encrypted MSIN, and HN public key identifier field. The HN public key identifier field in turn comprises the SDC.

In Step 3, the AMF 56 discovers the correct NF instance that is necessary to be contacted next (e.g., AUSF 60, UDM/SIDF) using the NRF 66 and all or part of the information received from the NG UE 52. (Note that in a most common use case, AMF 56 discovers AUSF 60.) As shown in FIG. 5, the NRF 66 discovers the UDM instance 62-1 from among multiple possible UDM instances 62-1 ... 62-N, by determining the UDM instance 62-1 based on the SDC. The NRS 66 in some embodiments bases this discovery on the MCC, MNC, and the HN public key identifier field (including the SDC) as shown. In Step 4, the AMF 56 invokes required services on the discovered NF instance.

Figure 6:
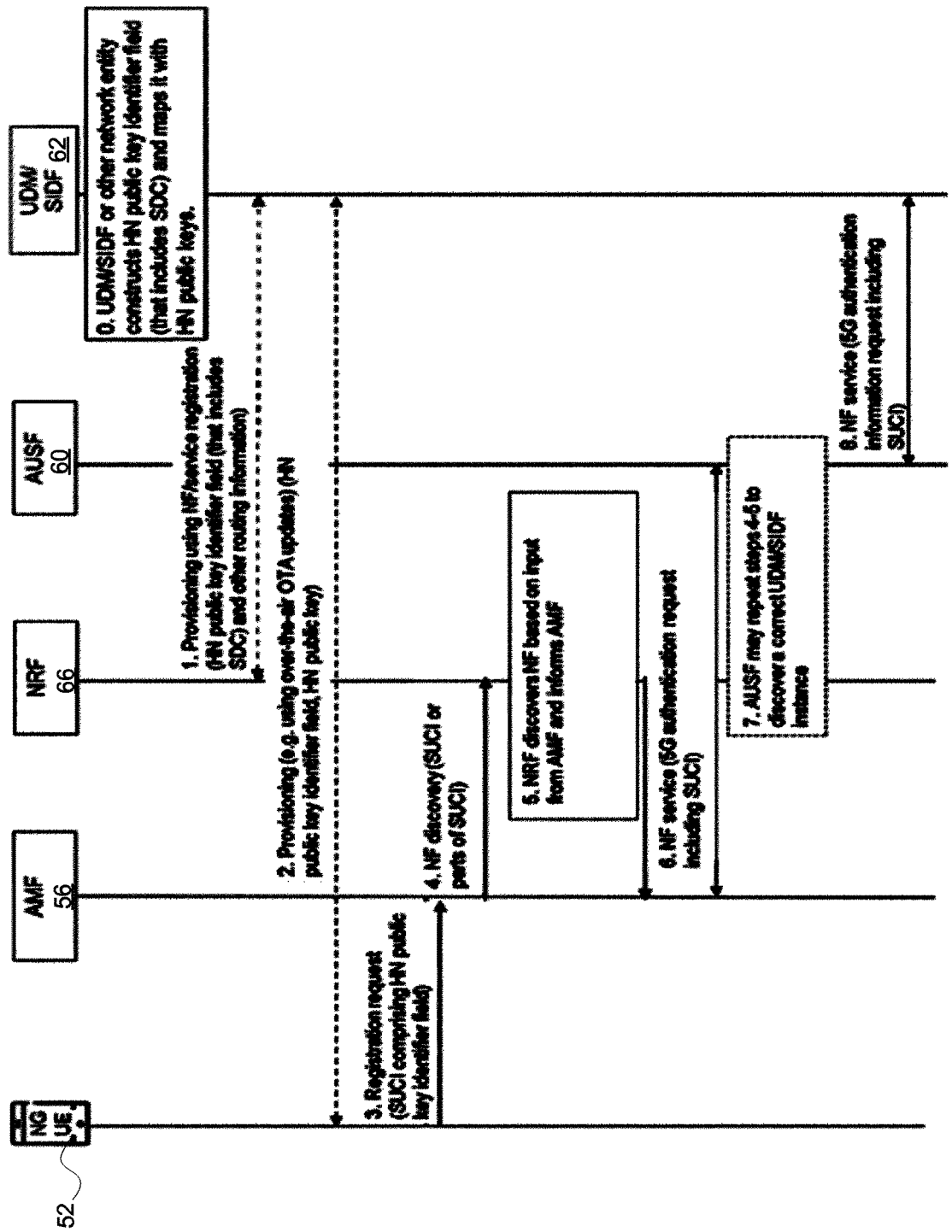
FIG. 6 is a call flow diagram for processing performed by a 5G UE and network functions for provider network function instance selection according to other embodiments.

For some further clarification, a sequence diagram of some embodiments is shown in FIG. 6.

Recall that the location of SIDF is determined by the operator, hence it could be standalone, combined with AUSF 60, combined with UDM 62, etc. in different proprietary operator deployment solutions. Here, co-location of UDM/SIDF 62 is taken as an example.

In Step 0, the UDM/SIDF 62 or other network entity (e.g., operator's operations and maintenance function (O&M)) constructs an HN public key identifier field (that includes the SDC for different SIDF deployment cases), and maps it with HN public keys.

The SDC itself may be based on various parameters like: (i) A randomly generated and operator specific identifier, e.g., a numeric value, say 12382, 88274, 93422145, etc.; (ii) HN public/private keys' internal identifier, e.g. a numeric value, say 2, 3, 4, etc.; (iii) Network deployment info, e.g. slice information, Network identifier, or sub-network identifier, say alphanumeric string "slice-1", "network_7", etc.; (iv) Geographical location or network's logical location/topology, e.g., alphanumeric string, say "stockholm-kista-2", "gothenburg-5", "lat:59.3293, lon:18.0686", etc.; (v) Encryption scheme(s) supported by different SIDF instances, e.g., alphanumeric string say "ECIES-brainpool", "ECIES-secp256r1", etc. (vi) References to the routing information of the related NF information, e.g. SIDF, UDM, AUSF, say alphanumeric string like "AUSF-1" referring to the IP address, etc.; (vii) Routing information of the related NF information, e.g. alphanumeric string like "10.10.1.192" showing the IP address, etc.; and/or (viii) Subscriber identifier info, e.g. range of SUPI, a tuple value say (1000000-500000), etc.

In Step 1, the UDM/SIDF provisions NRF 66 by invoking a NF/service registration procedure towards the NRF 66. The message to the NRF 66 comprises the UDM/SIDF's NF profile. The NRF 66 receives and stores the NF profile accordingly. Note that the NRF 66 is the hNRF in a roaming context.

Note that in addition to the usual information in the NF profile, the UDM/SIDF 62 also stores its supported HN public key identifier field (including SDC) and other routing information (e.g., IP addresses) as mentioned earlier in the NF profile.

In Step 2, the UDM/SIDF 62 or other network entity (e.g., operator's operations and maintenance function (O&M)) then provisions NG UE 52 with the HN public key identifier field along with the other information e.g., HN public key.

In Step 3, the NG UE 62 triggers a registration procedure towards the network by sending a registration request message that includes its SUCI. Recall that the SUCI in turn comprises at least the following when IMSI is used as SUPI (and that other SUPI formats, such as NAI, exist): (i)

Concealed or encrypted MSIN by the provisioned HN public key; (ii) MCC and MNC; and (iii) HN public key identifier field identifying the HN public key used for encryption. In our example, the same field also identifies the SDC.

In Step 4, the AMF 56, based on local configuration or operator's policy, can invoke NF discovery service towards the NRF 66 to discover and select a correct AUSF instance to handle the NG UE's authentication. (Note that, in some use cases, if the AMF 56 has to discover UDM 62 first, the AMF 56 may discover a UDM instance directly in this step). Note that with roaming context, AMF 56 contacts vNRF, and vNRF contacts hNRF (not shown in the figure). The AMF 56 may also be able to discover the AUSF 60 itself if it has local ability to perform the discovery as the NRF 56 has (as explained in Step 5). The AMF 56 uses the received SUCI or some parts of the received SUCI, e.g., only the HN public key identifier field, as input for NF instance selection.

In Step 5, the NRF 66 uses the input from AMF 56 to discover the correct AUSF instance. The NRF 66 informs the AMF 56 about the discovered AUSF 60. Note that in a roaming context, both vNRF and hNRF are involved.

For example, the NRF 66 may use the complete received SUCI or parts of the SUCI, e.g., received HN public key identifier field or only the SDC included in the HN public key identifier field, to match the attributes stored in NF profiles and further identify the proper AUSF instance. Identifying the SDC included in the HN public key identifier field is similar to the construction of the HN public key identifier field as explained earlier, e.g., splitting if concatenation was used, performing regular expression match if regular expression was used, and decrypting if encryption was used.

The AMF 56 then selects the AUSF instance from the output of NRF discovery result and in Step 6 sends the authentication request together with SUCI information to that selected AUSF instance.

In Step 7, the AUSF 60, based on local configuration or operator's policy, can invoke NF discovery service towards NRF 66 to find and select a correct UDM/SIDF instance to handle the UE's authentication request and de-conceal or decrypt the SUCI. The AUSF/NRF may repeat the similar procedures in step 4 & 5 to discover a correct UDM/SIDF instance.

In Step 8, the AUSF 60 then selects a proper UDM/SIDF 62 instances from the output of NRF discovery result and sends the authentication information request together with SUCI information to that selected NF instance.

As this example demonstrates, then, the complete SUCI may be made available for provider NF instance discovery and/or selection. This may include the home network identifier (e.g., MNC and/or MCC) of SUCI and also other parameters, such as protection scheme and the home network public key identifier. These parameters may be pre-provisioned to the UE 52, and always included into the SUCI. Note that doing so does not prevent the NF discovery or selection; rather using those parameters or fields in SUCI enables an extremely flexible mechanism that could be different among different vendors.

In some embodiments, SIDF is responsible for de-concealing the SUPI from the SUCI. SIDF is using the private key part of the privacy related home network public/private key pair that is securely stored in the home operator's network. The de-concealment shall take place at the UDM 62. Access rights to the SIDF shall be defined, such that only a network element of the home network is allowed to request SIDF.

In some embodiments, discovery and selection of network functions (NFs like AUSF, SIDF/UDM) with or without using NRF 66 shall use SUCI as input parameter, when SUCI is provided by the UE 52. The network may use SUCI in an implementation specific way Network deployments may comprise several AUSF and/or UDM instances serving different range of SUPIs. Since the subscription identifier is concealed in SUCI, though, the range of the subscription identifier is not available for AUSF or UDM selection. To assist the AUSF and UDM selection in the correct Home Network subdomain, the SUCI according to some embodiments include a parameter related to the subdomain the user belongs to. The NF discovery with SUCI may be locally configured on the NF consumers, or implemented in the hNRF. AUSF and/or UDM selection based on parameters encoded in SUCI depends on network deployment. In some embodiments, the complete SUCI needs to be available for the discovery. This includes the home network identifier (e.g., MNC and/or MCC) of SUCI and also other parameters, such as protection scheme and the home network public key identifier. These parameters may be pre-provisioned to the UE 52, and always included into the SUCI.

When the SEAF and AUSF 60 receive SUCI and the NRF 66 is used, the complete SUCI is used as input parameter for the AUSF and UDM service discovery. If NRF 66 is not used, the SEAF and/or AUSF 60 may use parameters encoded in SUCI to select AUSF and/or UDM respectively.

One option to implement the AUSF selection and/or the UDM discovery is to use the home network public key identifier as NF selection criteria. For example, each UDM 62 may have its own home network public key, and UDM 62 can be selected based on the related identifier. However, when a new home network public key is taken into use in UDM 62, the new identifier also needs to be updated into the NF discovery.

Alternatively, the home network public key identifier may have an internal structure of identifying the subdomain and the home network public key. For example, the identifier which is N bits long, could be constructed using a M bits long prefix identifying home network public key and a N-M bits long suffix identifying the subdomain, and the hNRF may use the suffix to discover the correct NF. The internal structure of the identifier is only known to the HPLMN and is privacy friendly.

Embodiments herein may therefore include a method, implemented in a function in home network (e.g. operation and maintenance function, UDM 62, or SIDF) for enabling discovery of an NF instance suitable for handling a subscriber's request. The method comprises constructing a sub-domain code. The sub-domain code may identify a sub-domain, e.g., so as to effectively identifier an NF instance (e.g., AUSF/SIDF/UDM) suitable for handling a subscriber. The method also comprises provisioning the sub-domain code to the UE. The method may also comprise provisioning the sub-domain code and corresponding routing information to another network function.

In some embodiments, the sub-domain code is or is indicated by a HN public key identifier field that identifies the HN public key used for SUPI encryption. Alternatively or additionally, the HN public key identifier field comprises of identification of the HN public key used for SUPI encryption and a concatenation or mask (e.g., regular expression) of the sub-domain code. In some embodiments, the routing information is an IP address. In some embodiments, the another network function is an NRF 66. In other embodiments, the another network function is AMF 56 or AUSF 60.

Embodiments herein also include a method implemented in a network function (e.g., AMF 56) in a network (e.g., visited or home network), for selecting a network function instance to provide a service (e.g., authentication, retrieval of allowed NSSAIs) for a UE. The method may comprise determining, based on a sub-domain code (SDC) received from the UE, which of a plurality of NF instances (e.g., AUSF/SIDF/UDM) is to be used for providing the service. In some embodiments, the method may also comprise communicating with identified NF instance.

In some embodiments, the determining comprises sending at least part of information received from the UE to an NRF 66, and receiving the NF information (e.g., AUSF/SIDF/UDM identification) and routing information. In other embodiments, the determining comprises using local information to identify the NF (e.g., AUSF/SIDF/UDM identification) and routing information.

In some embodiments, information received from the UE and used for NF discovery and/or selection is the whole SUCI. In other embodiments, information received from the UE and used for NF discovery and/or selection is part of the SUCI, e.g., HN public key identifier field.

In some embodiments, the HN public key identifier field contains SDC. In other embodiments, the SDC is a separate field in SUCI/SUPI.

Figure 7A:
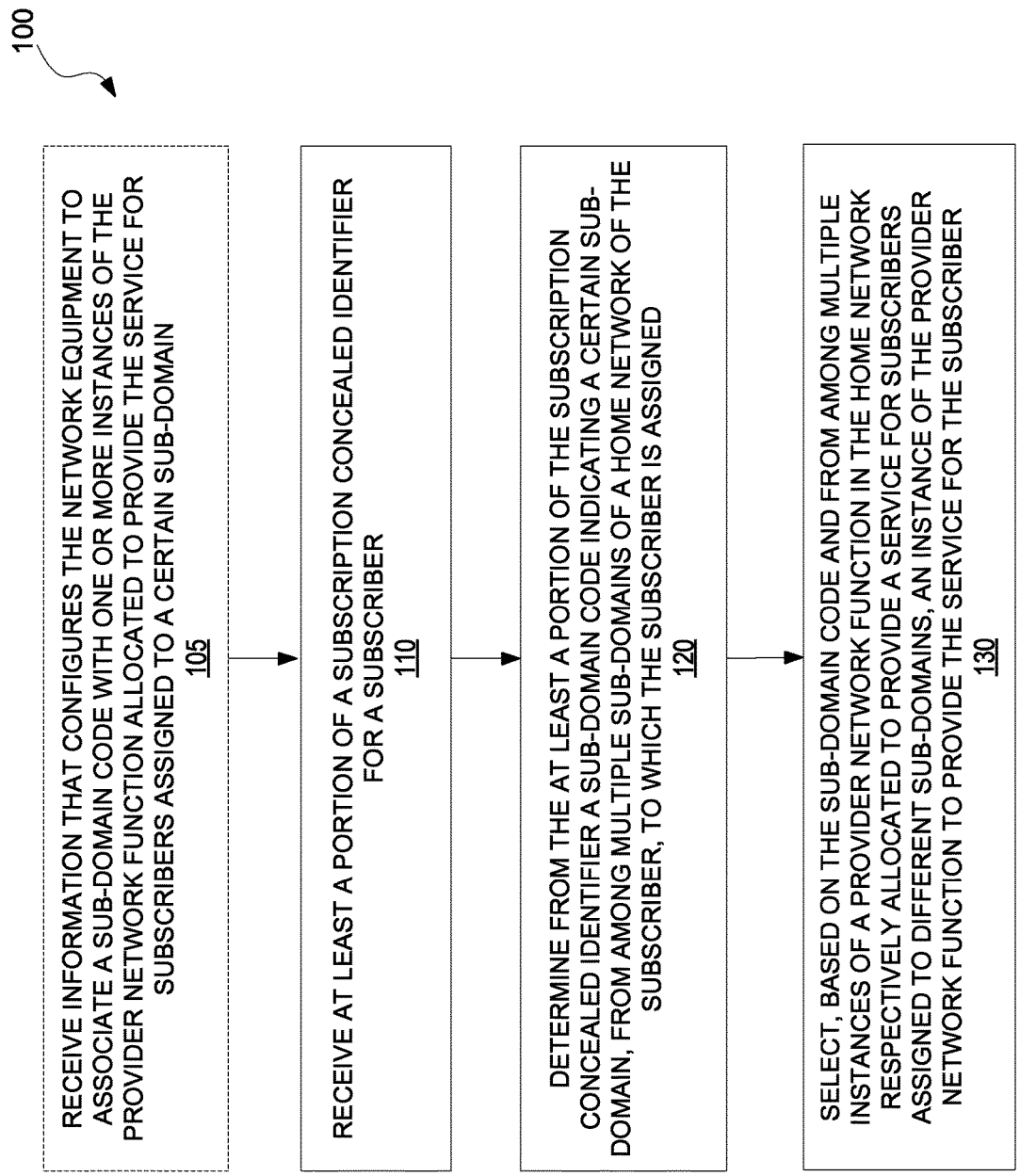
FIG. 7A is a logic flow diagram of a method performed by network equipment according to some embodiments.

In view of the above modifications and variations, FIG. 7A shows another method 100 performed by network equipment 26 in a wireless communication network 10. The method 100 comprises receiving at least a portion of a subscription concealed identifier for a subscriber 13 (Block 110). The subscription concealed identifier may contain a concealed subscription permanent identifier for the subscriber 13, such as a concealed SUPI. Regardless, the received at least a portion of the subscription concealed identifier indicates a sub-domain code 32. The sub-domain code indicates a certain sub-domain, from among multiple sub-domains of a home network of the subscriber 13, to which the subscriber 13 is assigned. The method 100 may also comprise determining, based on the sub-domain code 32, an instance of a provider network function to provide a service to be consumed for the subscriber 13 (Block 120). In some embodiments, for instance, this determination is made from among multiple instances of the provider network function in the home network respectively allocated to provide the service to be consumed for subscribers assigned to different sub-domains. In one or more embodiments, the determination is also based on a home network identifier that identifies the home network.

In some embodiments, the method 100 may also comprise receiving information that configures the network equipment 26 to associate the sub-domain code 32 with one or more instances of the provider network function allocated to provide the service for subscribers assigned to the certain sub-domain (Block 105).

Figure 7B:
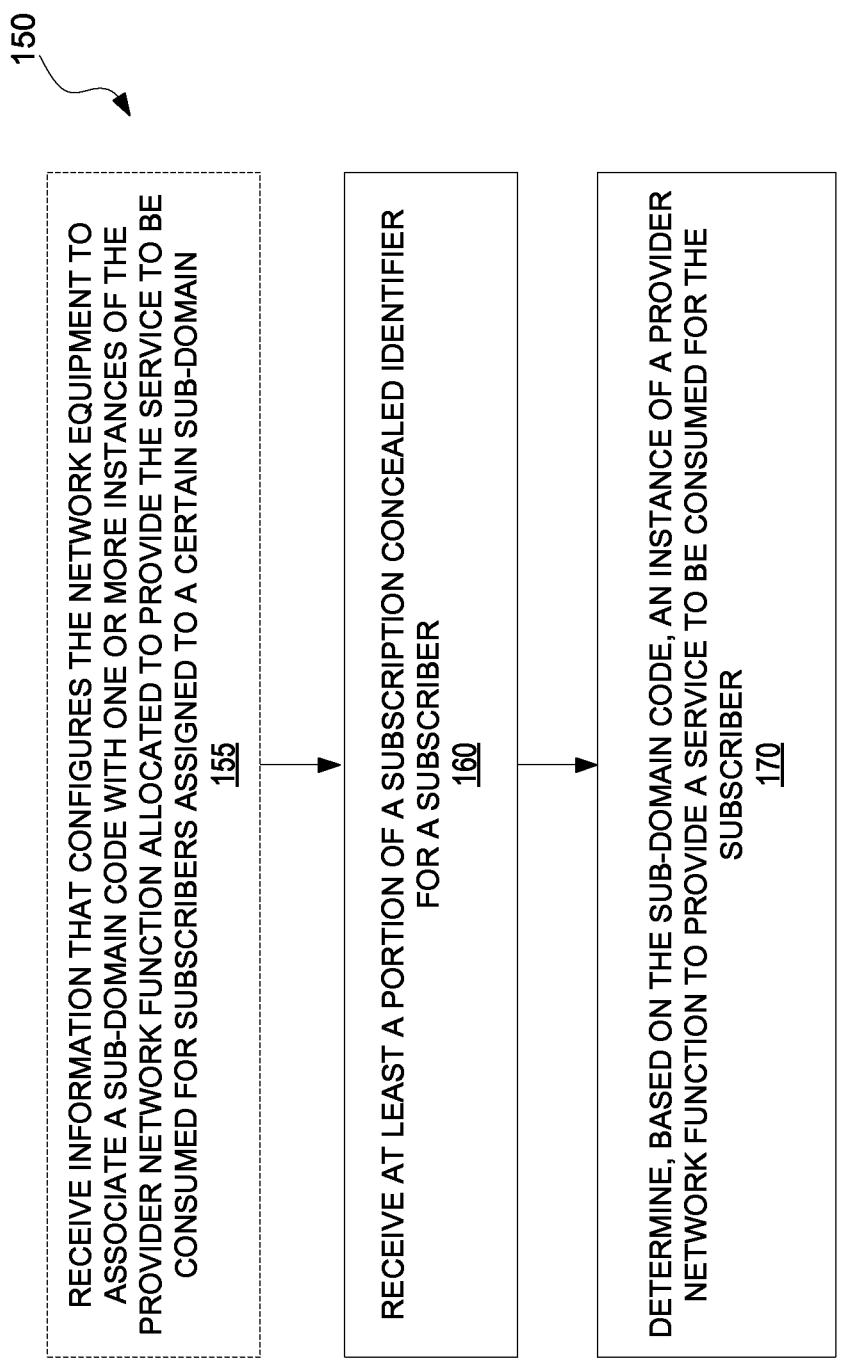
FIG. 7B is a logic flow diagram of a method performed by network equipment according to other embodiments.

FIG. 7B shows another method 150 performed by network equipment 26 in a wireless communication network 10. The method 150 comprises receiving at least a portion of a subscription concealed identifier for a subscriber 13 (Block 160). The subscription concealed identifier may contain a concealed subscription identifier for the subscriber 13. The method 150 may also comprise determining from the at least a portion of the subscription concealed identifier a sub-domain code 32 indicating a certain sub-domain, from among multiple sub-domains of a home network of the subscriber 13, to which the subscriber 13 is assigned (Block 170). The method 150 may also comprise selecting, based on the sub-domain code 32 and from among multiple instances of a provider network function in the home network respectively allocated to provide a service for subscribers assigned to different sub-domains, an instance of the provider network function to provide the service for the subscriber 13 (Block 180).

In some embodiments, the method 150 may also comprise receiving information that configures the network equipment 26 to associate the sub-domain code 32 with one or more instances of the provider network function allocated to provide the service for subscribers assigned to the certain sub-domain (Block 155).

In some embodiments, the method further comprises requesting or performing discovery of the multiple instances of the provider network function in the home network.

In some embodiments, the method further comprises receiving a discovery request for discovering one or more instances of the provider network function in the home network to provide the service for the subscriber and responding to the discovery request with the selected instance of the provider network function.

In some embodiments, the network equipment implements a network repository function, NRF.

In some embodiments, the network equipment serves as a proxy for an instance of a consumer network function that is to consume the service for the subscriber or serves as a proxy for one or more of the instances of the provider network function.

In some embodiments, the network equipment implements an instance of a consumer network function that is to consume the service for the subscriber, and the method further comprises consuming the service, from the selected instance of the provider network function, for the subscriber.

In some embodiments, the consumer network function is an access and mobility management function, AMF, or an authentication server function, AUSF.

In some embodiments, the method further comprises receiving information that configures the network equipment to associate the sub-domain code with one or more instances of the provider network function allocated to provide the service for subscribers assigned to the certain sub-domain.

In some embodiments, the information includes the certain sub-domain code and routing information for the one or more instances of the provider network function, such that the information configures the network equipment to associate the sub-domain code with the routing information.

In some embodiments, the routing information is an Internet Protocol, IP, address, a host name, a domain name, or a uniform resource identifier, of the selected instance.

In some embodiments, different sub-domains of the home network are indicated by different randomly generated and/or network operator specific sub-domain codes.

In some embodiments, different sub-domains of the home network correspond to different geographical or logical locations, and the sub-domain code is an identifier of a geographical or logical location with which the certain sub-domain corresponds.

In some embodiments, different sub-domains of the home network correspond to different slices or sub-networks of the home network, and the sub-domain code is an identifier of a certain slice or sub-network with which the certain sub-domain corresponds.

In some embodiments, different sub-domains of the home network are associated with different routing information, and the sub-domain code is an identifier associated with the routing information for the certain sub-domain.

In some embodiments, each sub-domain of the home network is associated with one or more ranges of subscription identifiers, and the sub-domain code is an identifier of one or more ranges of subscription identifiers associated with the certain sub-domain.

In some embodiments, determining the sub-domain code comprises determining the sub-domain code from a field in the at least a portion of the subscription concealed identifier, and the field is either a sub-domain code field dedicated to indicating a sub-domain code or a field configurable to indicate both the sub-domain code and encryption information identifying a parameter based on which the subscriber concealed identifier was encrypted.

In some embodiments, either the field is a home network public key field configurable to indicate both a sub-domain code and a home network public key based on which the subscriber concealed identifier was encrypted, the field is an encryption scheme identifier field configurable to indicate both a sub-domain code and an encryption scheme based on which the subscriber concealed identifier was encrypted, or a field that is different than the home network public key field and different from the encryption scheme identifier field.

In some embodiments, the field is a sub-domain code field dedicated to indicating a sub-domain code.

In some embodiments, the field is configurable to indicate both the sub-domain code and the encryption information.

In some embodiments, the field is a home network public key field and wherein the encryption information identifies a home network public key based on which the subscriber concealed identifier was encrypted.

In some embodiments, the field is configurable to indicate both the sub-domain code and the encryption information by concatenating the sub-domain code with the encryption information.

In some embodiments, the field is configurable to indicate both the sub-domain code and the encryption information by indicating the sub-domain code and the encryption information in a defined order, with zero or more delimiters between the sub-domain code and the encryption information.

In some embodiments, determining the sub-domain code comprises extracting the sub-domain code from the field separate from the encryption information.

In some embodiments, extracting the sub-domain code comprises applying a regular expression to the field that separates the sub-domain code from the encryption information.

In some embodiments, the provider network function is a unified data management function, a subscription identifier de-concealing function, or an authentication server function.

In some embodiments, the method further comprises sending an authentication request, for authentication of the subscriber, to the selected instance of the provider network function, wherein the authentication request includes the at least a portion of the subscriber concealed identifier.

Figure 8:
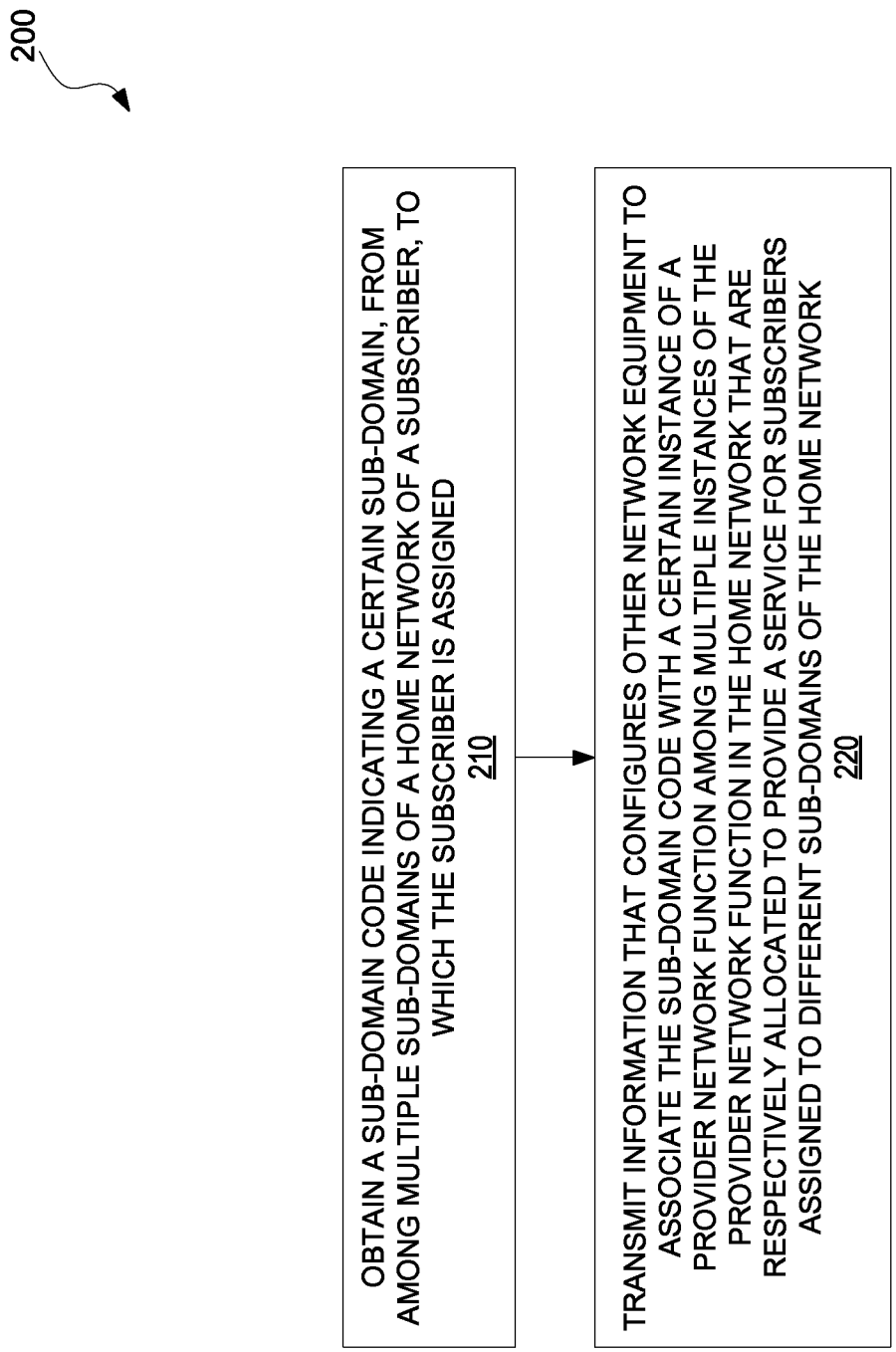
FIG. 8 is a logic flow diagram of a method performed by network equipment according to other embodiments.

FIG. 8 shows a method 200 performed by network equipment 40 in a wireless communication network 10 according to other embodiments. The method 200 includes obtaining a sub-domain code 32 indicating a certain sub-domain, from among multiple sub-domains of a home network of a subscriber 13, to which the subscriber 13 is assigned (Block 210). The method 200 may also include transmitting information that configures other network equipment 26 to associate the sub-domain code 32 with a certain instance of a provider network function among multiple instances of the provider network function in the home network that are respectively allocated to provide a service (to be consumed) for subscribers assigned to different sub-domains of the home network (Block 220).

In some embodiments, the information includes the sub-domain code and routing information for the certain instance, such that the information configures the other network equipment to associate the sub-domain code with the routing information.

In some embodiments, the routing information is an Internet Protocol, IP, address, a host name, a domain name, or a uniform resource identifier, of the certain instance.

In some embodiments, the network equipment implements an operation and maintenance function, the certain instance of the provider network function, or a proxy for the certain instance of the provider network function.

In some embodiments, the provider network function is a unified data management function, a subscription identifier de-concealing function, or an authentication server function.

In some embodiments, the other network equipment implements an instance of a consumer network function that is or is capable of consuming the service for a subscriber, implements a network repository function, serves as a proxy for an instance of a consumer network function that is to consume or is capable of consuming the service for a subscriber, or serves as a proxy for one or more of the instances of the provider network function.

In some embodiments, the other network equipment implements an access and mobility management function, AMF, an authentication server function, AUSF, or a network repository function.

In some embodiments, different sub-domains of the home network are indicated by different randomly generated and/or network operator specific sub-domain codes.

In some embodiments, different sub-domains of the home network correspond to different geographical or logical locations, and the sub-domain code is an identifier of a geographical or logical location with which the certain sub-domain corresponds.

In some embodiments, different sub-domains of the home network correspond to different slices or sub-networks of the home network, and the sub-domain code is an identifier of a certain slice or sub-network with which the certain sub-domain corresponds.

In some embodiments, different sub-domains of the home network are associated with different routing information, and the sub-domain code is an identifier associated with the routing information for the certain sub-domain.

In some embodiments, each sub-domain of the home network is associated with one or more ranges of subscription identifiers, and the sub-domain code is an identifier of one or more ranges of subscription identifiers associated with the certain sub-domain.

In some embodiments, the method further comprises generating a field that indicates the sub-domain code, wherein the field is either a sub-domain code field dedicated to indicating a sub-domain code or a field configurable to indicate both the sub-domain code and encryption information identifying a parameter based on which a subscriber concealed identifier for the subscriber is to be encrypted.

In some embodiments, either the field is a home network public key field configurable to indicate both a sub-domain code and a home network public key based on which the subscriber concealed identifier was encrypted, the field is an encryption scheme identifier field configurable to indicate both a sub-domain code and an encryption scheme based on which the subscriber concealed identifier was encrypted, or a field that is different than the home network public key field and different from the encryption scheme identifier field.

In some embodiments, the field is a sub-domain code field dedicated to indicating a sub-domain code.

In some embodiments, generating the field comprises generating the field to indicate both the sub-domain code and the encryption information.

In some embodiments, the field is a home network public key field and the encryption information identifies a home network public key based on which the subscriber concealed identifier is encrypted.

In some embodiments, generating the field comprises generating the field to indicate both the sub-domain code and the encryption information by concatenating the sub-domain code with the encryption information.

In some embodiments, generating the field comprises generating the field to indicate the sub-domain code and the encryption information in a defined order, with zero or more delimiters between the sub-domain code and the encryption information.

In some embodiments, the information that configures the other network equipment includes the field.

Figure 9:
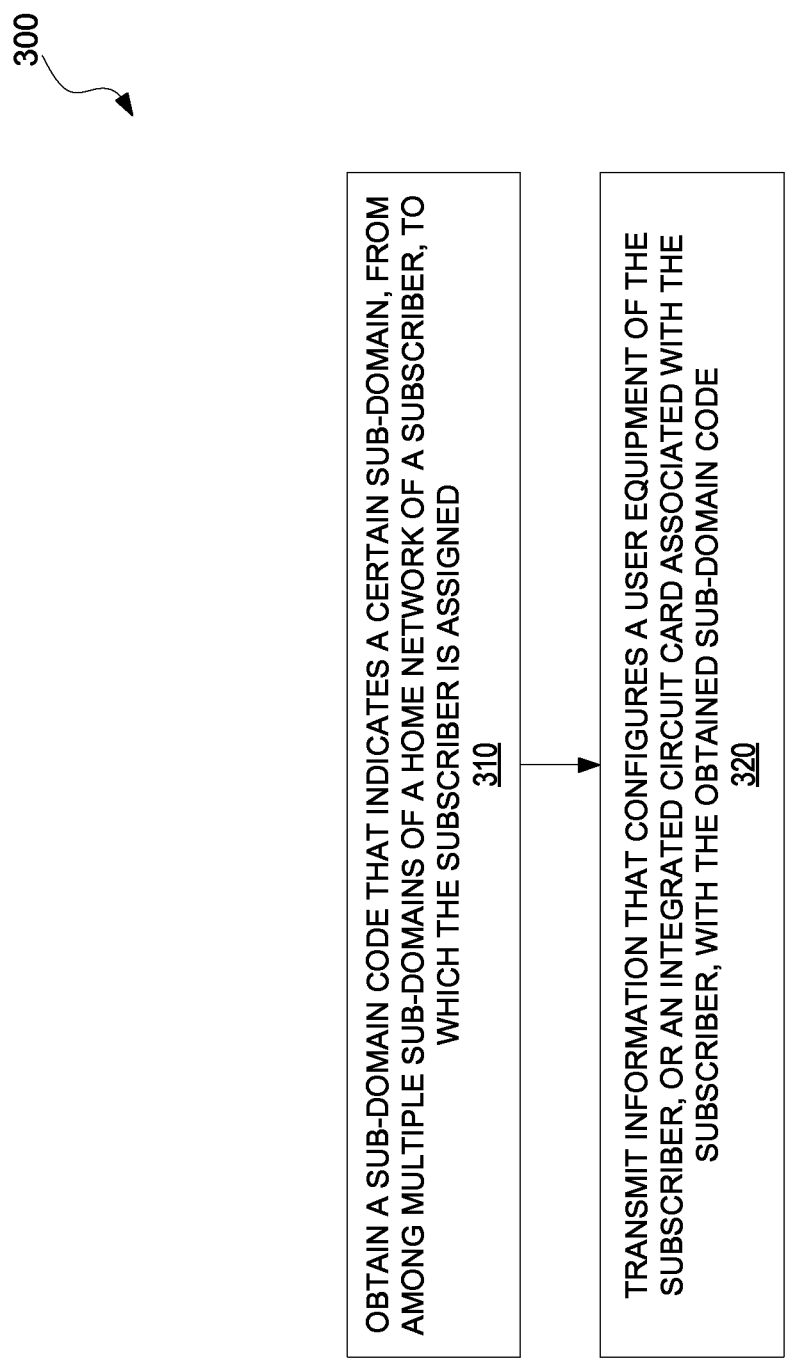
FIG. 9 is a logic flow diagram of a method performed by network equipment according to still other embodiments.

FIG. 9 shows a method 300 performed by network equipment 40 in a wireless communication network 10 according to still other embodiments The method 300 includes obtaining a sub-domain code 32 indicating a certain sub-domain, from among multiple sub-domains of a home network of a subscriber 13, to which the subscriber 13 is assigned (Block 310). The method 300 may also include transmitting information that configures a user equipment 12 of the subscriber 13, or an integrated circuit card 12A associated with the subscriber 13, with the obtained sub-domain code 32 (Block 320).

In some embodiments, the network equipment implements an operation and maintenance function, an instance of a provider network function in the home network that is to provide or is capable of providing a service for the subscriber, or a proxy for one or more instances of the provider network function.

In some embodiments, the provider network function is a unified data management function, a subscription identifier de-concealing function, or an authentication server function.

In some embodiments, different sub-domains of the home network are indicated by different randomly generated and/or network operator specific sub-domain codes.

In some embodiments, different sub-domains of the home network correspond to different geographical or logical locations, and the sub-domain code is an identifier of a geographical or logical location with which the certain sub-domain corresponds.

In some embodiments, different sub-domains of the home network correspond to different slices or sub-networks of the home network, and the sub-domain code is an identifier of a certain slice or sub-network with which the certain sub-domain corresponds.

In some embodiments, different sub-domains of the home network are associated with different routing information, and the sub-domain code is an identifier associated with the routing information for the certain sub-domain.

In some embodiments, each sub-domain of the home network is associated with one or more ranges of subscription identifiers, and the sub-domain code is an identifier of one or more ranges of subscription identifiers associated with the certain sub-domain.

In some embodiments, the method further comprises generating a field that indicates the sub-domain code, and the field is either a sub-domain code field dedicated to indicating a sub-domain code or a field configurable to indicate both the sub-domain code and encryption information identifying a parameter based on which a subscriber concealed identifier for the subscriber is to be encrypted.

In some embodiments, either the field is a home network public key field configurable to indicate both a sub-domain code and a home network public key based on which the subscriber concealed identifier was encrypted, the field is an encryption scheme identifier field configurable to indicate both a sub-domain code and an encryption scheme based on which the subscriber concealed identifier was encrypted, or a field that is different than the home network public key field and different from the encryption scheme identifier field.

In some embodiments, the field is a sub-domain code field dedicated to indicating a sub-domain code.

In some embodiments, generating the field comprises generating the field to indicate both the sub-domain code and the encryption information.

In some embodiments, the field is a home network public key field and wherein the encryption information identifies a home network public key based on which the subscriber concealed identifier is to be encrypted.

In some embodiments, generating the field comprises generating the field to indicate both the sub-domain code and the encryption information by concatenating the sub-domain code with the encryption information.

In some embodiments, generating the field comprises generating the field to indicate the sub-domain code and the encryption information in a defined order, with zero or more delimiters between the sub-domain code and the encryption information.

In some embodiments, said transmitting comprises transmitting the field to the user equipment or the integrated circuit card.

Figure 10:
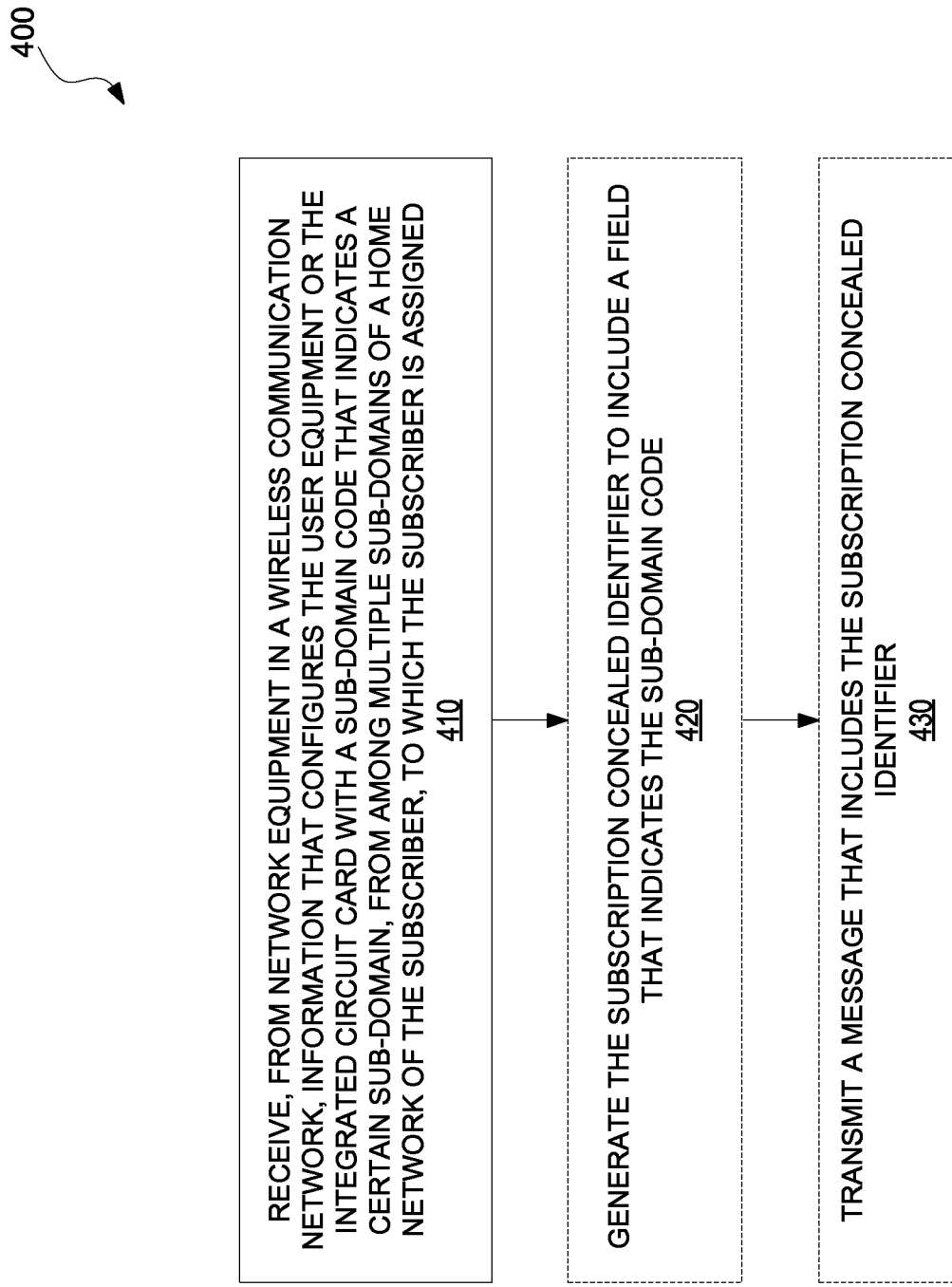
FIG. 10 is a logic flow diagram of a method performed by user equipment according to some embodiments.

FIG. 10 shows a method 400 performed by a user equipment 12 or an integrated circuit card 12A associated with a subscriber 13. The method 400 comprises receiving, from network equipment 40 in a wireless communication network 10, information that configures the user equipment 12 or the integrated circuit card 12A with a sub-domain code 32 that indicates a certain sub-domain, from among multiple sub-domains of a home network of the subscriber 13, to which the subscriber 13 is assigned (Block 410). In some embodiments, the method 400 may also comprise generating a subscription concealed identifier to include a field that indicates the sub-domain code 32 (Block 420) and transmitting a message that includes the subscription concealed identifier (Block 430).

In some embodiments, the network equipment implements an operation and maintenance function, an instance of a provider network function in the home network that is to provide or is capable of providing a service for the subscriber, or a proxy for one or more instances of the provider network function.

In some embodiments, the provider network function is a unified data management function, a subscription identifier de-concealing function, or an authentication server function.

In some embodiments, different sub-domains of the home network are indicated by different randomly generated and/or network operator specific sub-domain codes.

In some embodiments, different sub-domains of the home network correspond to different geographical or logical locations, and the sub-domain code is an identifier of a geographical or logical location with which the certain sub-domain corresponds.

In some embodiments, different sub-domains of the home network correspond to different slices or sub-networks of the home network, and the sub-domain code is an identifier of a certain slice or sub-network with which the certain sub-domain corresponds.

In some embodiments, different sub-domains of the home network are associated with different routing information, and the sub-domain code is an identifier associated with the routing information for the certain sub-domain.

In some embodiments, each sub-domain of the home network is associated with one or more ranges of subscription identifiers, and the sub-domain code is an identifier of one or more ranges of subscription identifiers associated with the certain sub-domain.

In some embodiments, receiving the sub-domain code comprises receiving a field that indicates the sub-domain code, and the field is either a sub-domain code field dedicated to indicating a sub-domain code or a field configurable to indicate both the sub-domain code and encryption information identifying a parameter based on which a subscriber concealed identifier for the subscriber is to be encrypted.

In some embodiments, either the field is a home network public key field configurable to indicate both a sub-domain code and a home network public key based on which the subscriber concealed identifier was encrypted, the field is an encryption scheme identifier field configurable to indicate both a sub-domain code and an encryption scheme based on which the subscriber concealed identifier was encrypted, or a field that is different than the home network public key field and different from the encryption scheme identifier field.

In some embodiments, the field is a sub-domain code field dedicated to indicating a sub-domain code.

In some embodiments, the field is configurable to indicate both the sub-domain code and the encryption information.

In some embodiments, the field is a home network public key field and wherein the encryption information identifies a home network public key based on which the subscriber concealed identifier is to be encrypted.

In some embodiments, the field is configurable to indicate both the sub-domain code and the encryption information by concatenating the sub-domain code with the encryption information.

In some embodiments, the field is configurable to indicate both the sub-domain code and the encryption information by indicating the sub-domain code and the encryption information in a defined order, with zero or more delimiters between the sub-domain code and the encryption information. In some embodiments, the method further comprises generating the subscription concealed identifier to include the field and transmitting a message that includes the subscription concealed identifier.

Note that in some embodiments, a public key may refer to a raw public key whereas in other embodiments a public key refers to a raw public key combined with a certificate that binds this public key to the address of the node having access to the private key for the public key.

An SMF herein may include some or all of the following functionality. Some or all of the SMF functions may be supported in a single instance of an SMF. SMF functionality may include session management (e.g. session establishment, modify and release, including tunnel maintain between UPF and access network node), UE IP address allocation & management (including optional authorization), selection and control of the UP function, configuration of traffic steering at UPF to route traffic to proper destination, termination of interfaces towards policy control functions, control of part of policy enforcement and quality of service (QoS), lawful intercept (for SM events and interface to lawful intercept system), termination of SM parts of NAS messages, downlink data notification, initiation of AN specific SM information, sent via AMF over N2 to AN, determination of service and session continuity (SSC) mode of a session (for IP type PDU session), roaming functionality, handling of local enforcement to apply QoS service level agreements (SLAs) (Visited public land mobile network, VPLMN), charging data collection and charging interface (VPLMN), lawful intercept (in VPLMN for SM events and interface to LI System), and support for interaction with external DN for transport of signalling for PDU session authorization/authentication by external DN.

By contrast, an Access and Mobility Management function (AMF) may include some or all of the following functionality. Some or all of the AMF functions may be supported in a single instance of a AMF: termination of radio access network (RAN) CP interface (N2), termination of NAS (N1), NAS ciphering and integrity protection, registration management, connection management, reachability management, mobility Management, lawful intercept (for AMF events and interface to LI System), transparent proxy for routing SM messages, access Authentication, access Authorization, security Anchor Function (SEA or SEAF), and security Context Management (SCM) which receives a key from the SEA that it uses to derive access-network specific keys. With particular regard to the SEA, it interacts with the authentication server function (AUSF) and the UE, and receives the intermediate key that was established as a result of the UE authentication process. In case of USIM based authentication, the AMF retrieves the security material from the AUSF.

Note further that embodiments herein may use any of one or more communication protocols known in the art or that may be developed, such as IEEE 802.xx, Code Division Multiple Access (CDMA), Wideband CDMA (WCDMA), Global System for Mobile telecommunications (GSM), Long Term Evolution (LTE), WiMax, New Radio (NR), or the like. Accordingly, although sometimes described herein in the context of 5G, the principles and concepts discussed herein are applicable to 4G systems and others.

A user equipment as used herein is any type device capable of communicating with another radio node wirelessly over radio signals. A user equipment may therefore refer to a wireless device, a mobile station, a laptop, a smartphone, a machine-to-machine (M2M) device, a machine-type communications (MTC) device, a narrowband Internet of Things (IoT) device, etc. That said, it should be noted that the user equipment does not necessarily have a "user" in the sense of an individual person owning and/or operating the user equipment. A user equipment may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment as described herein may be comprised in a vehicle and may perform monitoring and/or reporting of the vehicle's operational status or other functions associated with the vehicle.

As used herein, "network equipment" refers to equipment capable, configured, arranged and/or operable to communicate directly or indirectly with a user equipment and/or with other equipment in the wireless communication system 10 that enable and/or provide wireless access to the user equipment. Examples of network equipment include, but are not limited to, core network equipment in a core network (e.g., equipment that implements an AMF or SMF).

The network equipment 26 herein may perform the processing herein by implementing any functional means or units. In one embodiment, for example, the network equipment 26 comprises respective circuits configured to perform the steps shown in FIG. 7. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the network equipment 26 contains instructions executable by the processing circuitry whereby the network equipment 26 is configured to carry out the processing herein.

Figure 11A:
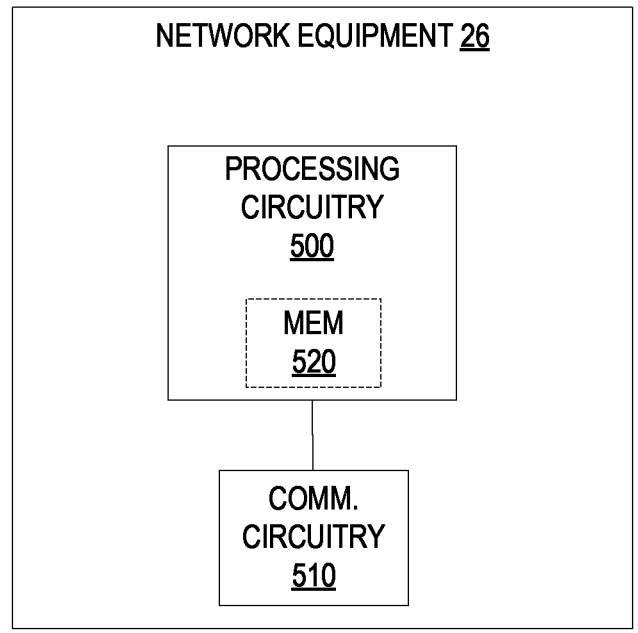
FIG. 11A is a block diagram of network equipment according to some embodiments.

FIG. 11A illustrates additional details of network equipment 26 in accordance with one or more embodiments. As shown, the network equipment 26 includes processing circuitry 500 and communication circuitry 510. The communication circuitry 510 is configured to communicate with other equipment in the network 10 (e.g., other network equipment and/or user equipment 12 and/or ICC 12A). The processing circuitry 500 is configured to perform processing described above, e.g., in FIGS. 7A and/or 7B, such as by executing instructions stored in memory 520. The processing circuitry 500 in this regard may implement certain functional means or units.

Figure 11B:
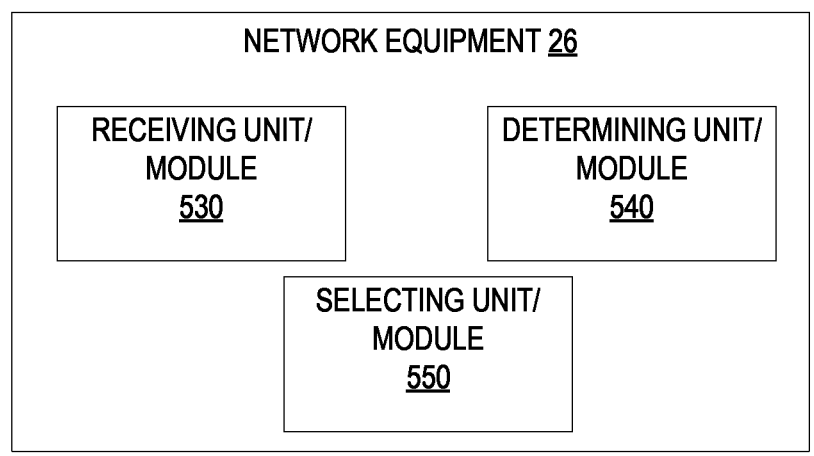
FIG. 11B is a block diagram of network equipment according to other embodiments.

FIG. 11B in this regard illustrates additional details of network equipment 26 in accordance with one or more other embodiments. As shown, the network equipment 26 may include a receiving unit or module 530 for receiving at least a portion of a subscription concealed identifier for a subscriber, wherein the subscription concealed identifier contains a concealed subscription identifier for the subscriber. Also included may be a determining unit or module 540 for determining from the at least a portion of the subscription concealed identifier a sub-domain code indicating a certain sub-domain, from among multiple sub-domains of a home network of the subscriber, to which the subscriber is assigned. Further include may be a selecting unit or module 550 for selecting, based on the sub-domain code and from among multiple instances of a provider network function in the home network respectively allocated to provide a service for subscribers assigned to different sub-domains, an instance of the provider network function to provide the service for the subscriber.

The network equipment 40 herein may perform the processing herein by implementing any functional means or units. In one embodiment, for example, the network equipment 40 comprises respective circuits configured to perform the steps shown in FIG. 8 and/or FIG. 9. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the network equipment 40 contains instructions executable by the processing circuitry whereby the network equipment 40 is configured to carry out the processing herein.

Figure 12A:
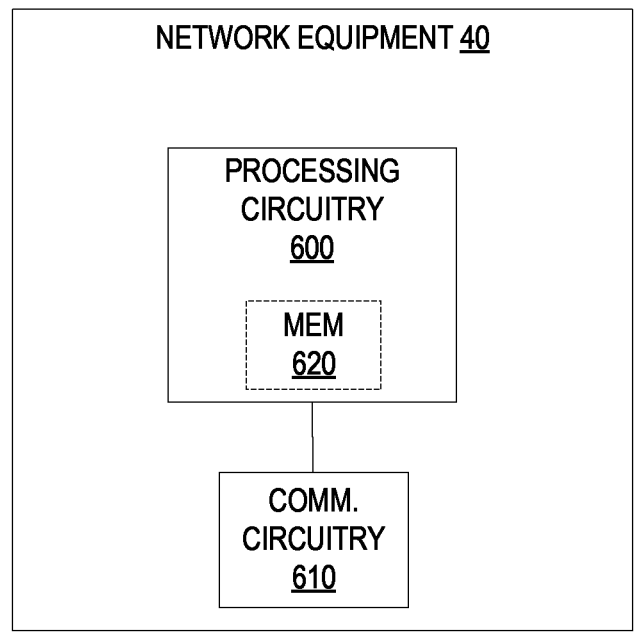
FIG. 12A is a block diagram of network equipment according to some embodiments.

FIG. 12A illustrates additional details of network equipment 40 in accordance with one or more embodiments. As shown, the network equipment 40 includes processing circuitry 600 and communication circuitry 510. The communication circuitry 510 is configured to communicate with other equipment in the network 10 (e.g., other network equipment and/or user equipment 12 and/or ICC 12A). The processing circuitry 600 is configured to perform processing described above, e.g., in FIG. 8, such as by executing instructions stored in memory 620. The processing circuitry 600 in this regard may implement certain functional means or units.

Figure 12B:
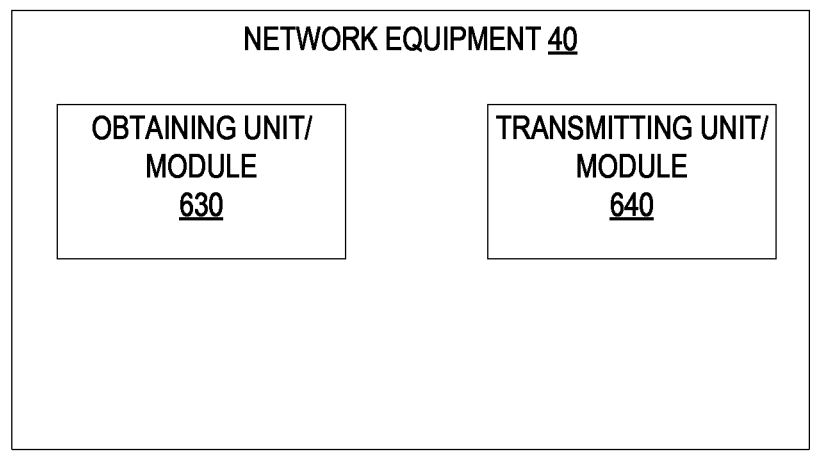
FIG. 12B is a block diagram of network equipment according to other embodiments.

FIG. 12B in this regard illustrates additional details of network equipment 40 in accordance with one or more other embodiments. As shown, the network equipment 40 may include an obtaining unit or module 630 for obtaining a sub-domain code indicating a certain sub-domain, from among multiple sub-domains of a home network of a subscriber, to which the subscriber is assigned. Also included may be a transmitting unit or module 640 for transmitting information that configures other network equipment to associate the sub-domain code with a certain instance of a provider network function among multiple instances of the provider network function in the home network that are respectively allocated to provide a service for subscribers assigned to different sub-domains of the home network.

Figure 13A:
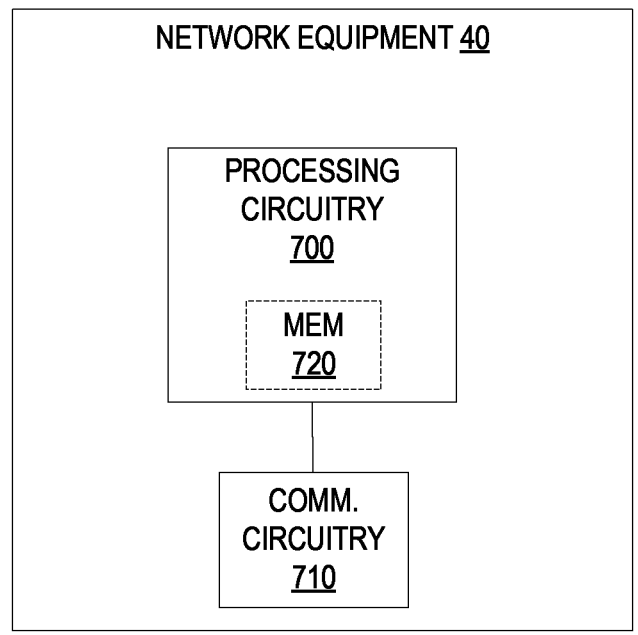
FIG. 13A is a block diagram of network equipment according to some embodiments.

FIG. 13A illustrates additional details of network equipment 40 in accordance with still other embodiments. As shown, the network equipment 40 includes processing circuitry 700 and communication circuitry 710. The communication circuitry 710 is configured to communicate with other equipment in the network 10 (e.g., other network equipment and/or user equipment 12 and/or ICC 12A). The processing circuitry 700 is configured to perform processing described above, e.g., in FIG. 9, such as by executing instructions stored in memory 720. The processing circuitry 700 in this regard may implement certain functional means or units.

Figure 13B:
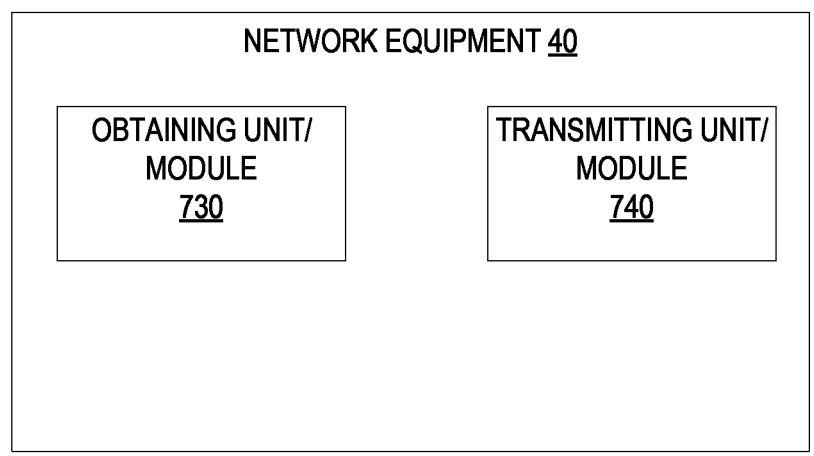
FIG. 13B is a block diagram of network equipment according to other embodiments.

FIG. 13B in this regard illustrates additional details of network equipment 40 in accordance with one or more other embodiments. As shown, the network equipment 40 may include an obtaining unit or module 730 for obtaining a sub-domain code indicating a certain sub-domain, from among multiple sub-domains of a home network of a subscriber, to which the subscriber is assigned. Also included may be a transmitting unit or module 740 for transmitting information that configures a user equipment of the subscriber, or an integrated circuit card associated with the subscriber, with the obtained sub-domain code.

The user equipment 12 and/or ICC 12A herein may perform the processing herein by implementing any functional means or units. In one embodiment, for example, the user equipment 12 and/or ICC 12A comprises respective circuits configured to perform the steps shown in FIG. 10. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the user equipment 12 and/or ICC 12A contains instructions executable by the processing circuitry whereby the user equipment 12 and/or ICC 12A is configured to carry out the processing herein.

Figure 14A:
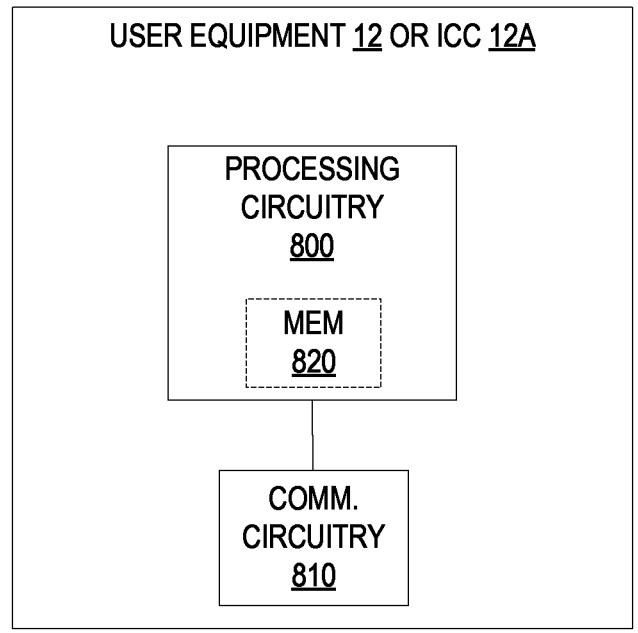
FIG. 14A is a block diagram of user equipment according to some embodiments.

FIG. 14A illustrates additional details of user equipment 12 and/or ICC 12A in accordance with one or more embodiments. As shown, the user equipment 12 and/or ICC 12A includes processing circuitry 800 and communication circuitry 810. The communication circuitry 810 is configured to communicate with other equipment in the network 10 (e.g., network equipment and/or other user equipment and/or ICC). The processing circuitry 800 is configured to perform processing described above, e.g., in FIG. 10, such as by executing instructions stored in memory 820. The processing circuitry 800 in this regard may implement certain functional means or units.

Figure 14B:
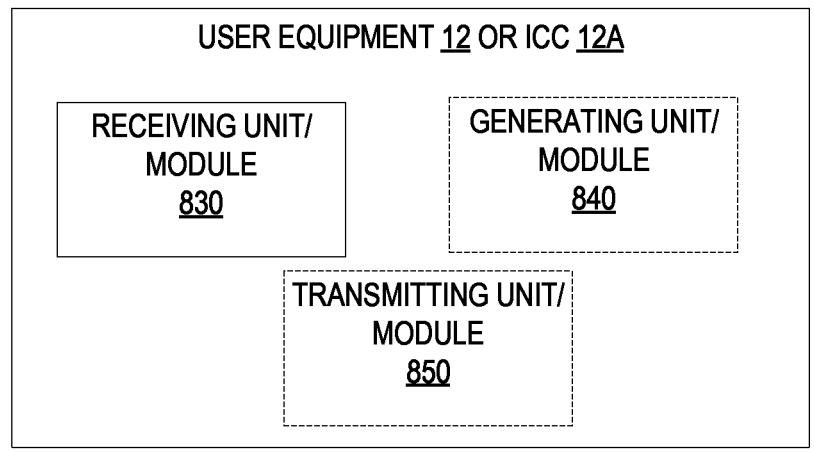
FIG. 14B is a block diagram of user equipment according to other embodiments.

FIG. 14B in this regard illustrates additional details of user equipment 12 and/or ICC 12A in accordance with one or more other embodiments. As shown, the user equipment 12 and/or ICC 12A may include a receiving unit or module 830 for receiving, from network equipment in a wireless communication network, information that configures the user equipment or the integrated circuit card with a sub-domain code that indicates a certain sub-domain, from among multiple sub-domains of a home network of the subscriber, to which the subscriber is assigned. In some embodiments, further included is a generating unit or module 840 for generating a subscription concealed identifier to include a field that indicates the sub-domain code and a transmitting unit or module 850 for transmitting a message that includes the subscription concealed identifier.

Those skilled in the art will also appreciate that embodiments herein further include corresponding computer programs.

A computer program comprises instructions which, when executed on at least one processor (e.g., of network equipment 26, network equipment 40, user equipment 12 or ICC 12A), cause the processor to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method performed by network equipment in a wireless communication network, the method comprising:
   receiving at least a portion of a subscription concealed identifier for a subscriber, wherein the subscription concealed identifier contains a concealed subscription permanent identifier for the subscriber, wherein the received at least a portion of the subscription concealed identifier indicates a sub-domain code, wherein the sub-domain code indicates a certain sub-domain, from among multiple sub-domains of a home network of the subscriber, to which the subscriber is assigned, wherein the sub-domain code is different than a home network identifier that identifies the home network of the subscriber; and
   determining, based on the sub-domain code and from among multiple instances of a provider network function in the home network respectively allocated to provide a service to be consumed for subscribers assigned to different sub-domains, an instance of the provider network function to provide the service to be consumed for the subscriber.

2. The method of claim 1, wherein determining the instance of the provider network function to provide the service to be consumed for the subscriber is also based on the home network identifier.

3. The method of claim 1, further comprising receiving a discovery request for discovering one or more instances of the provider network function in the home network to provide the service to be consumed for the subscriber and responding to the discovery request with the selected instance of the provider network function.

4. The method of claim 1, wherein the network equipment implements a network repository function, NRF.

5. The method of claim 1, wherein different sub-domains of the home network are associated with different routing information, and wherein the sub-domain code is an identifier associated with the routing information for the certain sub-domain.

6. The method of claim 1, wherein determining the sub-domain code comprises determining the sub-domain code from a field in the at least a portion of the subscription concealed identifier, wherein the field is a sub-domain code field dedicated to indicating a sub-domain code.

7. The method of claim 1, wherein the home network identifier includes a mobile network code and a mobile country code, wherein the provider network function is an authentication server function such that said determining comprises determining, based on the sub-domain code and from among multiple instances of an authentication server function in the home network respectively allocated to provide a service to be consumed for subscribers assigned to different sub-domains, an instance of the authentication server function to provide the service to be consumed for the subscriber.

8. A method performed by network equipment in a wireless communication network, the method comprising:
   obtaining a sub-domain code indicating a certain sub-domain, from among multiple sub-domains of a home network of a subscriber, to which the subscriber is assigned, wherein the sub-domain code is different than a home network identifier that identifies the home network of the subscriber; and transmitting information that configures other network equipment to associate the sub-domain code with a certain instance of a provider network function among multiple instances of the provider network function in the home network that are respectively allocated to provide a service to be consumed for subscribers assigned to different sub-domains of the home network.

9. The method of claim 8, wherein the network equipment implements an operation and maintenance function, the certain instance of the provider network function, or a proxy for the certain instance of the provider network function.

10. The method of claim 8, wherein the other network equipment implements a network repository function.

11. The method of claim 8, wherein different sub-domains of the home network are associated with different routing information, and wherein the sub-domain code is an identifier associated with the routing information for the certain sub-domain.

12. The method of claim 8, further comprising generating a field that indicates the sub-domain code, wherein the field is a sub-domain code field dedicated to indicating a sub-domain code, and wherein the information that configures the other network equipment includes the field.

13. The method of claim 8, wherein the home network identifier includes a mobile network code and a mobile country code, wherein the provider network function is an authentication server function such that the transmitted information configures the other network equipment to associate the sub-domain code with a certain instance of the authentication server function among multiple instances of the authentication server function in the home network that are respectively allocated to provide the service to be consumed for subscribers assigned to different sub-domains of the home network.

14. A method performed by network equipment in a wireless communication network, the method comprising:
obtaining a sub-domain code that indicates a certain sub-domain, from among multiple sub-domains of a home network of a subscriber, to which the subscriber is assigned, wherein the sub-domain code is different than a home network identifier that identifies the home network of the subscriber; and
transmitting information that configures a user equipment of the subscriber, or an integrated circuit card associated with the subscriber, with the obtained sub-domain code.

15. The method of claim 14, wherein the network equipment implements an operation and maintenance function, an instance of a provider network function in the home network that is to provide or is capable of providing a service to be consumed for the subscriber, or a proxy for one or more instances of the provider network function.

16. The method of claim 15, wherein the provider network function is a unified data management function, a subscription identifier de-concealing function, or an authentication server function.

17. The method of claim 14, wherein different sub-domains of the home network are associated with different routing information, and wherein the sub-domain code is an identifier associated with the routing information for the certain sub-domain.

18. The method of claim 14, further comprising generating a field that indicates the sub-domain code, wherein the field is a sub-domain code field dedicated to indicating a sub-domain code, and wherein said transmitting comprises transmitting the field to the user equipment or the integrated circuit card.

19. The method of claim 14, wherein different instances of an authentication server function in the home network are respectively allocated to different sub-domains of the home network, wherein the home network identifier includes a mobile network code and a mobile country code.

20. A method performed by a user equipment or an integrated circuit card associated with a subscriber, the method comprising:
receiving, from network equipment in a wireless communication network, information that configures the user equipment or the integrated circuit card with a sub-domain code that indicates a certain sub-domain, from among multiple sub-domains of a home network of the subscriber, to which the subscriber is assigned, wherein the sub-domain code is different than a home network identifier that identifies the home network of the subscriber; and
transmitting a message that includes a subscription concealed identifier, wherein the subscription concealed identifier contains a concealed subscription permanent identifier for the subscriber and indicates the sub-domain code.

21. The method of claim 20, wherein the network equipment implements an operation and maintenance function, an instance of a provider network function in the home network that is to provide or is capable of providing a service to be consumed for the subscriber, or a proxy for one or more instances of the provider network function.

22. The method of claim 21, wherein the provider network function is a unified data management function, a subscription identifier de-concealing function, or an authentication server function.

23. The method of claim 20, wherein different sub-domains of the home network are associated with different routing information, and wherein the sub-domain code is an identifier associated with the routing information for the certain sub-domain.

24. The method of claim 20, wherein receiving the sub-domain code comprises receiving a field that indicates the sub-domain code, wherein the field is a sub-domain code field dedicated to indicating a sub-domain code.

25. The method of claim 20, wherein different instances of an authentication server function in the home network are respectively allocated to different sub-domains of the home network, wherein the home network identifier includes a mobile network code and a mobile country code.

26. Network equipment configured for use in a wireless communication network, the network equipment comprising:
communication circuitry; and
processing circuitry configured to:
receive, via the communication circuitry, at least a portion of a subscription concealed identifier for a subscriber, wherein the subscription concealed identifier contains a concealed subscription permanent identifier for the subscriber, wherein the received at least a portion of the subscription concealed identifier indicates a sub-domain code, wherein the sub-domain code indicates a certain sub-domain, from among multiple sub-domains of a home network of the subscriber, to which the subscriber is assigned, wherein the sub-domain code is different than a home network identifier that identifies the home network of the subscriber; and determine, based on the sub-domain code and from among multiple instances of a provider network function in the home network respectively allocated to provide a service to be consumed for subscribers assigned to different sub-domains, an instance of the provider network function to provide the service to be consumed for the subscriber.

27. The network equipment of claim 26, wherein the home network identifier includes a mobile network code and a mobile country code, wherein the provider network function is an authentication server function such that the processing circuitry is configured to determine, based on the sub-domain code and from among multiple instances of an authentication server function in the home network respectively allocated to provide a service to be consumed for subscribers assigned to different sub-domains, an instance of the authentication server function to provide the service to be consumed for the subscriber.

28. A user equipment or an integrated circuit card configured to be associated with a subscriber, the user equipment or integrated circuit card comprising:
communication circuitry; and
processing circuitry configured to:
receive, via the communication circuitry and from network equipment in a wireless communication network, information that configures the user equipment or the integrated circuit card with a sub-domain code that indicates a certain sub-domain, from among multiple sub-domains of a home network of the subscriber, to which the subscriber is assigned, wherein the sub-domain code is different than a home network identifier that identifies the home network of the subscriber; and
transmit, via the communication circuitry, a message that includes a subscription concealed identifier, wherein the subscription concealed identifier contains a concealed subscription permanent identifier for the subscriber and indicates the sub-domain.

29. The user equipment of claim 28, wherein the home network identifier includes a mobile network code and a mobile country code, wherein the provider network function is an authentication server function such that multiple instances of an authentication server function in the home network are respectively allocated to provide a service to be consumed for subscribers assigned to different sub-domains.

* * * * *